US012607175B2

(12) United States Patent
Shin et al.

(10) Patent No.: US 12,607,175 B2
(45) Date of Patent: Apr. 21, 2026

(54) ELECTRO-OSMOTIC PUMP, METHOD OF MANUFACTURING ELECTRODE, FLUID PUMPING SYSTEM USING THE SAME, AND OPERATION METHOD THEREOF

(71) Applicant: CAREMEDI CO., LTD., Seoul (KR)

(72) Inventors: Woonsup Shin, Seoul (KR); Enhua Zhu, Seoul (KR); Kyeonghyeon Kim, Icheon-si (KR); Junyeong Kang, Seoul (KR)

(73) Assignee: CAREMEDI CO., LTD., Seoul (KR)

( * ) Notice: Subject to any disclaimer, the term of this patent is extended or adjusted under 35 U.S.C. 154(b) by 548 days.

(21) Appl. No.: 18/058,295

(22) Filed: Nov. 23, 2022

(65) Prior Publication Data

US 2023/0167813 A1 Jun. 1, 2023

(30) Foreign Application Priority Data

Nov. 26, 2021 (KR) ........................ 10-2021-0165573

(51) Int. Cl.
B01D 61/42 (2006.01)
F04B 19/00 (2006.01)

(52) U.S. Cl.
CPC .......... F04B 19/006 (2013.01); B01D 61/427 (2013.01)

(58) Field of Classification Search
CPC ...... B01D 61/427; F02B 61/045; F04B 17/03; F04B 19/00; F04B 19/006
See application file for complete search history.

(56) References Cited

U.S. PATENT DOCUMENTS

| | | | |
|---|---|---|---|
| 4,861,689 A | 8/1989 | Clough | |
| 2004/0026246 A1* | 2/2004 | Chapples | H01B 1/122 |
| | | | 204/296 |
| 2008/0070088 A1 | 3/2008 | Sunako | |
| 2010/0105040 A1 | 4/2010 | Lau | |
| 2014/0088506 A1 | 3/2014 | Heller et al. | |
| 2016/0025083 A1* | 1/2016 | Shin | F04B 19/006 |
| | | | 417/48 |
| 2016/0177931 A1 | 6/2016 | Shin | |
| 2017/0312692 A1* | 11/2017 | Shin | B01D 61/427 |

(Continued)

FOREIGN PATENT DOCUMENTS

| | | |
|---|---|---|
| BR | 9713991 A | 2/2000 |
| CN | 1193927 A | 9/1998 |

(Continued)

OTHER PUBLICATIONS

English Machine Translation of JP2020056407 (Year: 2020).*

(Continued)

*Primary Examiner* — Gurpreet Kaur
(74) *Attorney, Agent, or Firm* — Shih IP Law Group, PLLC

(57) ABSTRACT

An electro-osmotic pump according to an embodiment of the present disclosure includes: a membrane that allows fluid movement; and a first electrode and a second electrode respectively provided on both sides of the membrane. The first electrode and the second electrode are formed of an impermeable substrate material and an electrode material coated thereon and have at least one fluid pathway. The impermeable substrate material is a plate-shaped substrate including at least one of a conducting material, a semiconducting material and a non-conducting material.

20 Claims, 19 Drawing Sheets

(56) References Cited

U.S. PATENT DOCUMENTS

| | | | |
|---|---|---|---|
| 2020/0217752 A1 | 7/2020 | Shin | |
| 2020/0360585 A1 | 11/2020 | Herschman | |

FOREIGN PATENT DOCUMENTS

| | | | | |
|---|---|---|---|---|
| CN | 2915240 Y | | 6/2007 | |
| CN | 110755699 A | | 2/2020 | |
| EP | 3480462 A1 | | 5/2019 | |
| JP | 2020056407 A | * | 4/2020 | |
| KR | 20190000760 A | * | 1/2019 | ............ B01D 1/427 |
| WO | 2011155839 A1 | | 12/2011 | |
| WO | 2013087804 A1 | | 6/2013 | |
| WO | 2021182923 A1 | | 9/2021 | |
| WO | 2021242061 A1 | | 12/2021 | |

OTHER PUBLICATIONS

English Machine Translation KR-20190000760 (Year: 2019).*

Office Action of Singapore Patent Application No. 10202260184U—Invitation to Respond to Written Opinion dated May 1, 2025.

Office Action of Indian Patent Application No. 202214067613, dated Sep. 29, 2025.

Alejandro N. Colli et al., Non-Precious Electrodes for Practical Alkaline Water Electrolysis, Materials 2019, 12, 1336, Apr. 24, 2019.

Hong Je Cho et al., Development of a novel decal transfer process for fabrication of high-performance and reliable membrane electrode assemblies for PEMFCs, International Journal of Hydrogen Energy 36(2011), Jul. 31, 2011.

Lin Li et al., Advancement of electroosmotic pump in microflow analysis: A review, Analytica Chimica Acta, Feb. 14, 2019.

* cited by examiner

FIG. 14A
WITHOUT THERMO-COMPRESSION
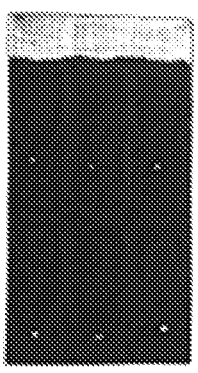
FIG. 14B
FIG. 14C
WITH THERMO-COMPRESSION          WITH THERMO-COMPRESSION
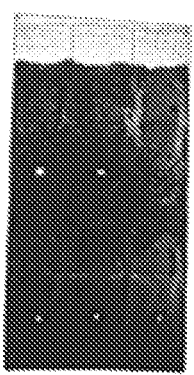     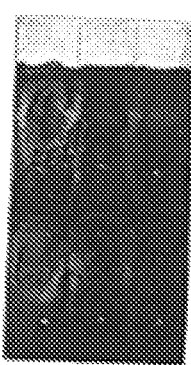

```
                    START

FORM ONE OR MORE FLUID PATHWAYS IN
   PLATE-SHAPED SUBSTRATE MADE OF        S110
   IMPERMEABLE SUBSTRATE MATERIAL

COAT ELECTRODE MATERIAL ON SUBSTRATE    S120

END
```

```
                    START

COAT ELECTRODE MATERIAL ON
  PLATE-SHAPED SUBSTRATE MADE OF          S210
   IMPERMEABLE SUBSTRATE MATERIAL

FORM ONE OR MORE FLUID PATHWAYS IN       S220
              SUBSTRATE

END
```

ELECTRO-OSMOTIC PUMP, METHOD OF MANUFACTURING ELECTRODE, FLUID PUMPING SYSTEM USING THE SAME, AND OPERATION METHOD THEREOF

CROSS-REFERENCE TO RELATED APPLICATION

This application claims the benefit under 35 U.S.C. 119(a) of Korean Patent Applications No. 10-2021-0165573 filed on Nov. 26, 2021 in the Korean Intellectual Property Office, the entire disclosures of which are incorporated herein by reference for all purposes.

TECHNICAL FIELD

The present disclosure relates to an electro-osmotic pump, a method of manufacturing an electrode, a fluid pumping system using the same, and an operation method of the system.

BACKGROUND

An electro-osmotic pump is a pump which utilizes fluid movement caused by electro-osmosis that occurs when a voltage is applied to both ends of a porous membrane.

FIG. 1A is a diagram for explaining an action of an electro-osmotic pump in which a fluid moves through a porous membrane according to an embodiment of the present disclosure. The porous membrane has numerous pathways through which a fluid can flow and one of which is shown below in FIG. 1A.

In general, silica, glass, and the like are used as materials of the porous membrane. When these materials are immersed in an aqueous solution, the surface becomes negatively charged. When a voltage is applied in this state, the fluid moves from a positive electrode part to a negative electrode part (upper diagram in FIG. 1A). The porous membrane has numerous pathways through which the fluid can path. In one of the pathways, the surface of the fluid pathway with bound anions is balanced in charge by mobile cations with positive charges. When a voltage is applied in this state, the mobile cations move along the surface from the positive electrode part toward the negative electrode part. Accordingly, all of the fluid coupled via a hydrogen bond network slides and flows. This phenomenon is called electro-osmosis, and a pump using this principle is an electro-osmotic pump.

Referring to FIG. 1A, electrodes used in the electro-osmotic pump employ various electrode materials coated on a porous electrode, such as a Pt mesh, porous carbon paper or carbon cloth, or a porous structure, to facilitate fluid movement. When a voltage is applied to these electrodes with a porous silica membrane interposed therebetween, the fluid moves accordingly.

In general, electrode substrate materials having a porous structure are mainly used as the electrodes of the electro-osmotic pump to facilitate fluid movement. In this case, an electrode substrate material may be formed into an electrode structure that can have a porous form, or only an electrode material that can be coated or modified on an electrode substrate material by electroplating may be used. However, the use of various electrode materials that can be coated on an impermeable substrate material by drop-coating or spin-coating has been limited.

SUMMARY

In order to solve this problem, an embodiment of the present disclosure proposes an electro-osmotic pump in which various electrode materials formed on an impermeable substrate material are replaced for components of a porous electrode part in a conventional electro-osmotic pump.

The problems to be solved by the present disclosure are not limited to the above-described problems. There may be other problems to be solved by the present disclosure.

As a technical means for solving the above-described technical problem, an electro-osmotic pump according to an embodiment of the present disclosure includes: a membrane that allows fluid movement; and a first electrode and a second electrode respectively provided on both sides of the membrane. The first electrode and the second electrode are formed of an impermeable substrate material and an electrode material coated thereon and have at least one fluid pathway. The impermeable substrate material is a plate-shaped substrate including at least one of a conducting material, a semiconducing material and a non-conducting material.

A method of manufacturing an electrode that constitutes an electro-osmotic pump according to another embodiment of the present disclosure includes: a process of forming at least one fluid pathways in a plate-shaped substrate made of an impermeable substrate material and coating an electrode material on the substrate to obtain an electrode; or a process of coating an electrode material on a plate-shaped substrate made of an impermeable substrate material and forming at least one fluid pathways in the substrate to obtain an electrode.

According to the present disclosure, an electrode in a conventional electro-osmotic pump is a porous electrode based on a Pt mesh, porous carbon paper or carbon cloth to facilitate fluid movement, whereas an electro-osmotic pump of the present disclosure uses an impermeable substrate material having at least one fluid pathway. Thus, the electro-osmotic pump of the present disclosure can be constructed by using various electrode materials that can be drop-coated or spin-coated.

Also, the present disclosure provides not only scalability by which much more diverse electrode materials can be coated on the surface of an electrode in various ways, but also simplicity in the configuration of an electro-osmotic pump by allowing the use of a substrate as a current collector.

BRIEF DESCRIPTION OF THE DRAWINGS

In the detailed description that follows, embodiments are described as illustrations only since various changes and modifications will become apparent to a person with ordinary skill in the art from the following detailed description. The use of the same reference numbers in different figures indicates similar or identical items.

FIG. 14A illustrates an electrode in which $RuO_x$ is drop-coated but not thermo-compressed on a Ti plate, FIG. 14B and FIG. 14C illustrate an electrode in which $RuO_x$ is drop-coated on a Ti plate and then thermo-compressed thereon by using a thermo-compressor according to an embodiment of the present disclosure.

DETAILED DESCRIPTION

Figure 1A:
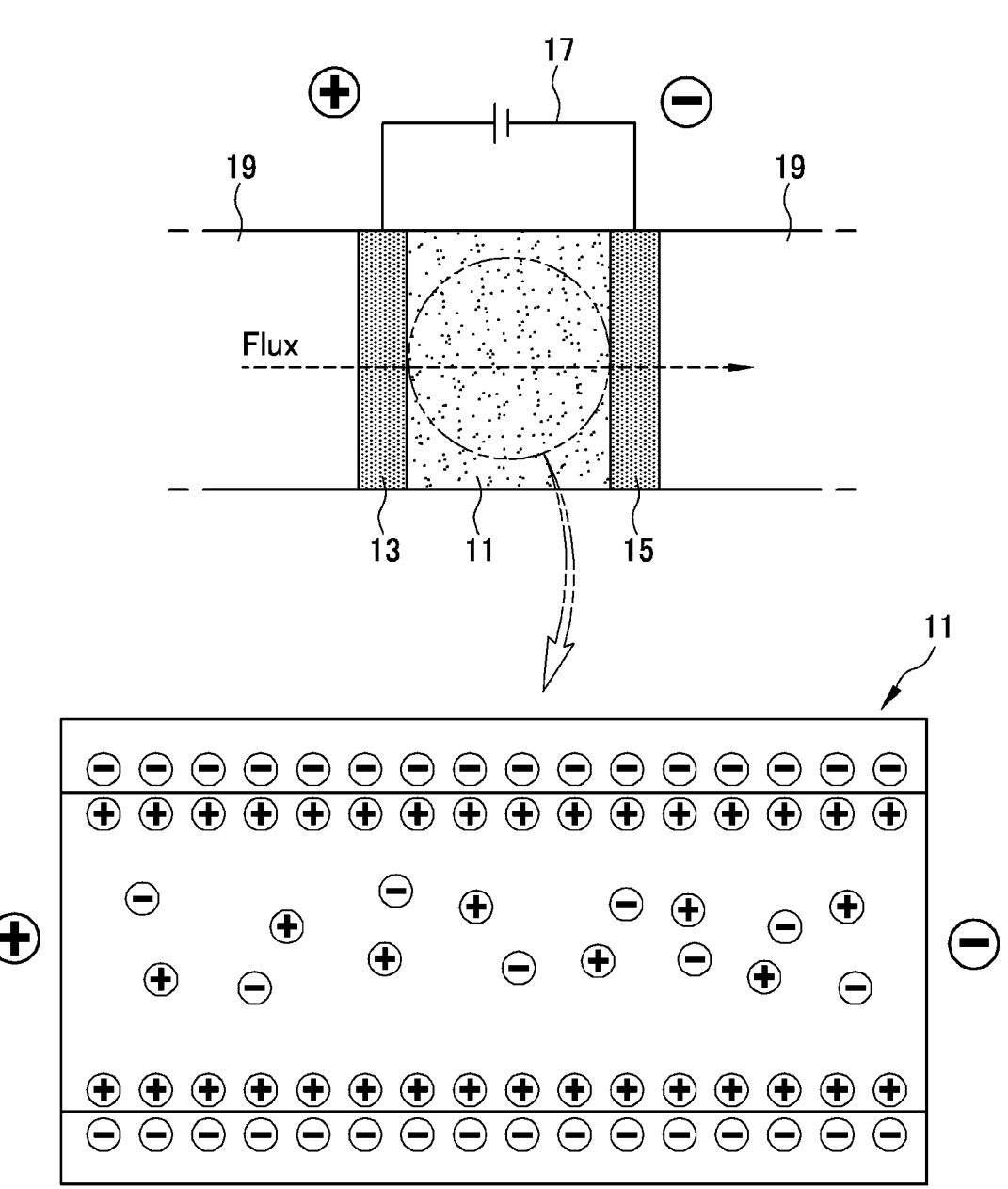
FIG. 1A is a diagram for explaining an action of an electro-osmotic pump in which a fluid moves through a porous membrane according to an embodiment of the present disclosure.

Hereafter, embodiments will be described in detail with reference to the accompanying drawings so that the present disclosure may be readily implemented by a person with ordinary skill in the art. However, it is to be noted that the present disclosure is not limited to the embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected to" another element and an element being "electronically connected to" another element via another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that at least one other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

First, the term "impermeability" in the present disclosure is defined as not having any gap or hole through which liquid or gas can pass, and it is different from properties of porous materials such as a mesh structure material, a foam type material, carbon paper and a structure in which a number of particles are aggregated. According to the present disclosure, a fluid pathway is formed in an electrode manufactured by coating an electrode material on a plate-shaped impermeable substrate material, and, thus, a fluid can pass through the electrode and a membrane. Conventionally, an electrode is manufactured by coating an electrode material on a porous substrate material, and, thus, the process is limited by non-diverse porous substrate materials. However, according to the present disclosure, the electrode is manufactured using various kinds of impermeable substrate materials, and, thus, it is possible to increase the degree of freedom in the process and reduce the manufacturing cost of the electrode.

Figure 1B:
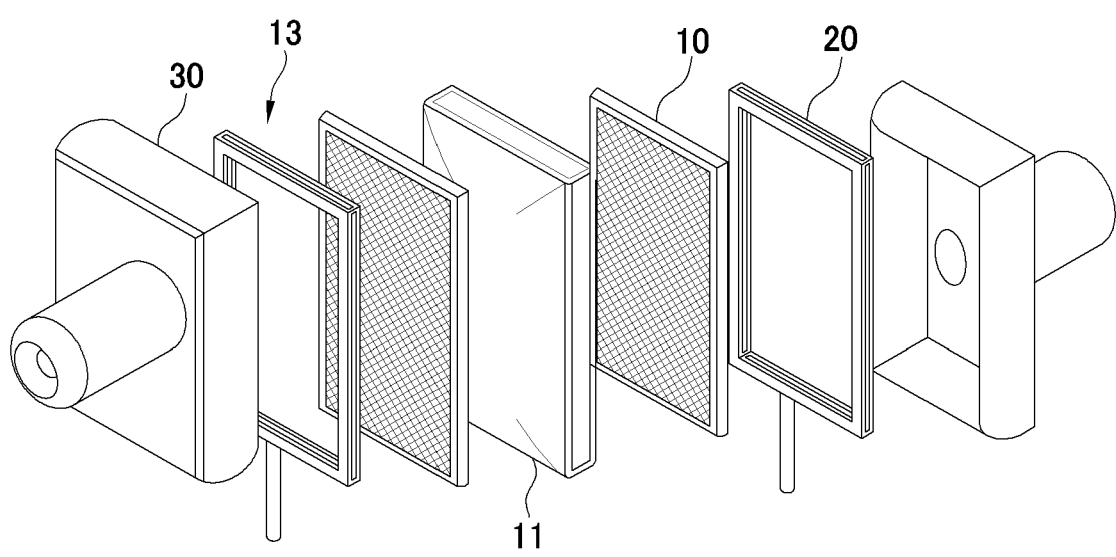
FIG. 1B is a diagram illustrating a configuration of a conventional electro-osmotic pump using porous electrodes.

(Example 1) Comparison Between a Configuration of an Electro-Osmotic Pump Using a Conventional Porous Electrode and a Configuration of an Electro-Osmotic Pump Using an Impermeable Electrode of the Present Disclosure FIG. 1B is a diagram illustrating a configuration of a conventional electro-osmotic pump using porous electrodes.

As shown as an example, a conventional electro-osmotic pump (EOP) is manufactured by respectively sequentially connecting a porous electrode 13 and 15, a silver (Ag) contact strip 20 and a support frame 30 on both sides of a porous silica membrane 11 and then fixing them with epoxy.

Referring to FIG. 1A and FIG. 1B, the conventional electro-osmotic pump includes the porous silica membrane 11 provided in a fluid pathway part 19 where a fluid flows, the porous electrodes 13 and 15 respectively provided on both sides of the membrane 11, the contact strip 20 connected to the respective electrodes and supplying power thereto, and the support frames 30. The contact strip 20 includes a connection member with a power supply 17, and transfers power supplied from the power supply 17 provided outside the pump to the porous electrodes 13 and 15.

Figure 2A:
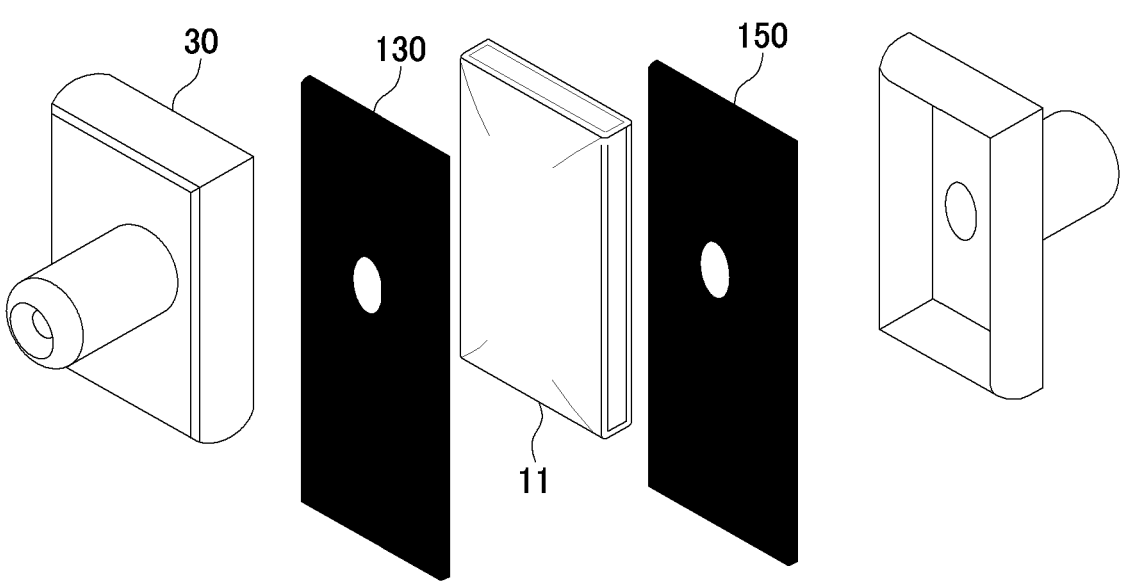
FIG. 2A and FIG. 2B are diagrams illustrating a configuration of an electro-osmotic pump using impermeable electrodes according to an embodiment of the present disclosure.
Figure 2B:
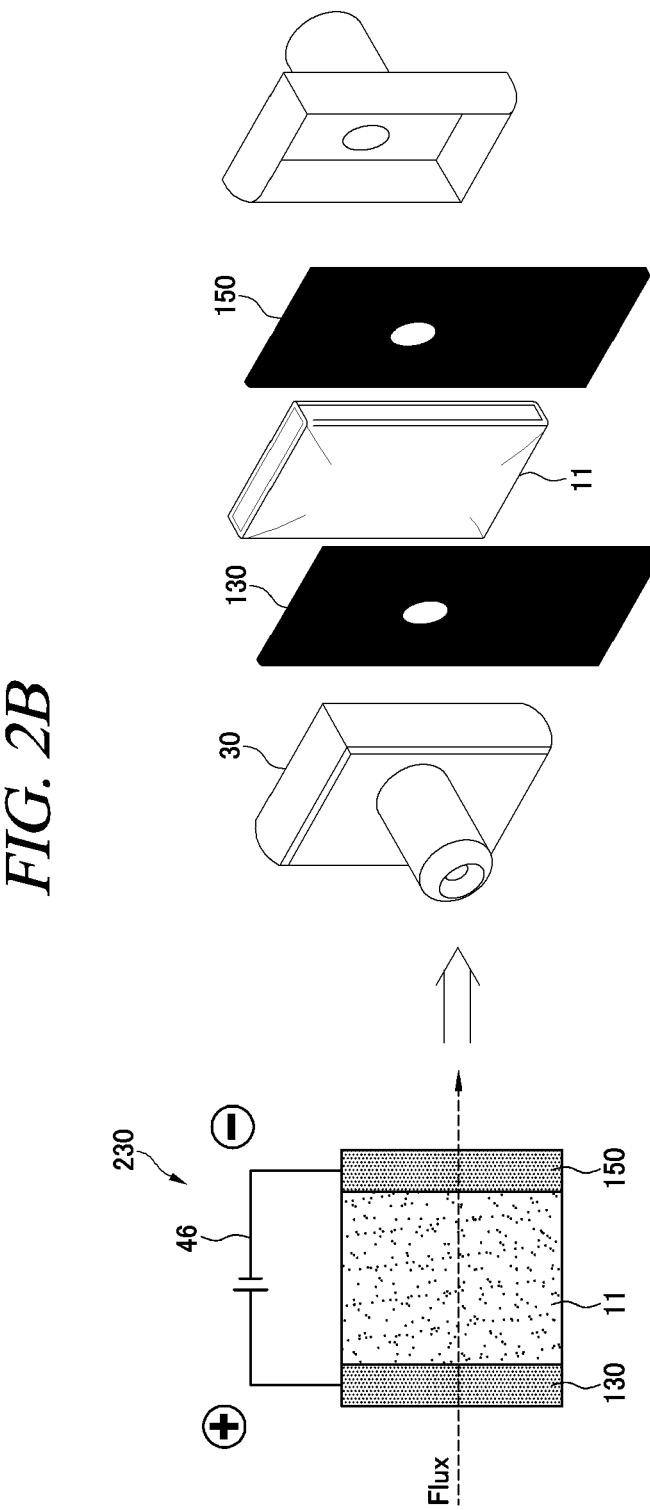

FIG. 2A and FIG. 2B are diagrams illustrating a configuration of an electro-osmotic pump using impermeable electrodes according to an embodiment of the present disclosure.

Referring to FIG. 2A, the electro-osmotic pump of the present disclosure includes the membrane 11, a first electrode 130, a second electrode 150 and a pair of frames 30.

For example, as shown in FIG. 2A, the electro-osmotic pump includes the membrane 11 that allows fluid movement and the first electrode 130 and the second electrode 150 respectively provided on both sides of the membrane 11. Herein, the first electrode 130 and the second electrode 150 are formed of an impermeable substrate material and an electrode material coated thereon, and have at least one fluid pathway. That is, in the electro-osmotic pump, the fluid may move through the fluid pathway by an electrochemical reaction of the first electrode 130 and the second electrode 150.

Also, referring to FIG. 2B, an electro-osmotic pump 230 may further include the frames 30 that support the first electrode 130 and the second electrode 150 on both sides thereof, respectively, and have a fluid pathway, and a power supply 46 that supplies a voltage to the first electrode 130 and the second electrode 150.

The electro-osmotic pump 230 supplies a voltage with alternating polarities to each of the first electrode 130 and the second electrode 150 and repeated electrochemical reactions occur in forward and reverse directions. Therefore, a pumping force can be generated by a repeated reciprocating movement of the fluid. Further, each of the first electrode 130 and the second electrode 150 can be repeatedly consumed and regenerated by repeated electrochemical reactions in forward and reverse directions.

For example, as shown in the drawing, the first and second electrodes 130 and 150 are plate-shaped electrodes formed of an impermeable substrate material and an electrode material, and are impermeable, not porous. Also, the first and second electrodes 130 and 150 have a fluid pathway of 1 mm in diameter in the middle.

That is, according to the present disclosure, the performance of the electro-osmotic pump can be improved by attaching the electrode material to the surface of the impermeable substrate material by various methods such as drop-coating. Also, according to the present disclosure, a separate contact strip configured to transfer power to each electrode in a conventional electro-osmotic pump is not needed and the plate-shaped electrode itself can be used as an electrical contact, and, thus, the electro-osmotic pump can have a simple configuration.

For example, the electro-osmotic pump 230 generates a positive pressure and a negative pressure by a fluid flow between the membrane 11 and the first and second electrodes 130 and 150. Further, the membrane 11 is formed of a porous material or structure to allow movement of the fluid.

For example, when a voltage is supplied to each of the electrodes 130 and 150, the voltage difference between the first electrode 130 and the second electrode 150 causes an oxidation-reduction reaction in the first electrode 130 and the second electrode 150, which results in an imbalance in charge. Here, cations in the electrodes 130 and 150 move through the fluid pathway to balance the charge. In this case, one of the first electrode 130 and the second electrode 150 may generate cations through an electrochemical reaction, and the other may consume the cations. Here, the cations generated and consumed during the electrochemical reaction may be monovalent cations, but are not limited thereto, and may include various ions such as hydrogen ions ($H^+$), sodium ions ($Na^+$), potassium ions ($K^+$), etc.

When the movement of the ions through the membrane 11 occurs during the oxidation-reduction reaction, the fluid may move through the fluid pathway in the electrodes. In this case, the membrane 11 may allow movement of the ions as well as the fluid. Accordingly, when power is supplied to the electrodes 130 and 150, the fluid and ions may move from one side to the other side of the membrane 11 or from the other side to one side.

Further, a conducting polymer electrode material may be coated on the first electrode 130 and the second electrode 150. In this case, when the electrode material contains a macroanionic polymer (i.e., an anionic polymer), the anionic polymer is fixed and cannot move during the oxidation-reduction reaction of the electrodes 130 and 150. Therefore, the cations move to balance the charge. That is, in order to balance the charge of the fixed anionic polymer, the cations present in the fluid are mixed in during a reduction reaction and the cations are released during an oxidation reaction. The cations slide and move on the negatively charged surface of the membrane 11 due to the voltage applied to both ends, and hydrated water molecules and water molecules connected thereto by hydrogen bonds are connected to each other so that the electro-osmotic pump 230 can move the fluid at a high speed.

Specifically, the impermeable substrate material as a plate-shaped substrate including at least one of a conducting material, a semiconducting material and a non-conducting material may be a plate, foil or a film. Here, the conducting material includes at least one selected from carbon, nickel, copper, gold, silver, titanium, ruthenium, palladium, zinc, platinum, cobalt, lead, manganese, tin, iridium, iron, aluminum, gold oxide, silver oxide, ruthenium oxide, platinum oxide, lead oxide, iridium oxide, polypyrroles, polypyrrole derivatives, polyanilines, polyaniline derivatives, polythiophenes, polythiophene derivatives, and combinations thereof. The semiconducting material includes at least one selected from Sn, Si, SiC, Ge, Se, AlP, AlAs, AlSb, GaP, GaAs, InP, InAs, InSb, ZnS, ZnSe, ZnTe, CdS, CdSe, CdTe, ZnO, $SnO_2$, $SiO_2$, $CeO_2$, $TiO_2$, $WO_3$, $Fe_2O_3$, $In_2O_3$, CuO, polypyrroles, polypyrrole derivatives, polyaniline, polyaniline derivatives, polythiophenes, polythiophene derivatives, Prussian blue, iron hexacyanoferrate (FeHCF), copper hexacyanoferrate (CuHCF), cobalt hexacyanoferrate (CoHCF), nickel hexacyanoferrate, and combinations thereof. The non-conducting material includes at least one selected from polyethylene (PE), polypropylene (PP), polyvinylidene fluoride (PVDF), polyvinylidene chloride (PVDC), ethylenevinylalcohol (EVOH), polyethylene terephthalate (PET), poly (methyl methacrylate) (PMMA), polyolefine, polyamide, polyester, aramid, acryl, polyethylene oxide, polycaprolactone, polycarbonate, polyurethane (PU), polystyrene, polybezimidazole (PBI), poly(2-hydroxyethyl methacrylate), poly(ether imide), styrene-butadiene-styrene triblock copolymer (SBS), poly(ferrocenyldimethylsilane), polyimide (PI), and combinations thereof.

For example, the electrode material includes at least one selected from metals, metal oxides, conducting polymers, metal hexacyanoferrates, carbon nanostructures and composites thereof. For example, the electrode material is composed of a metal, a metal oxide, a conducting polymer, a metal hexacyanoferrate, a carbon nanostructure or a composite thereof.

Hereinafter, examples of each electrode material will be described. The metals include at least one of silver, zinc, lead, manganese, copper, tin, ruthenium, nickel, gold, titanium, palladium, platinum, cobalt, iron, aluminum, iridium and combinations thereof. Also, the metal oxides include at least one of vanadium oxide, molybdenum oxide ($MoO_3$), tungsten oxide ($WO_3$), ruthenium oxide, iridium oxide, manganese oxide, cerium oxide ($CeO_2$), silver oxide, platinum oxide, lead oxide, polyoxometalate and combinations thereof.

The conducting polymers include at least one of polyaniline, polyaniline derivatives, polythiophene, polythiophene derivatives, polypyrrole, polypyrrole derivatives, quinone polymers, quinone polymer derivatives, polythionine and combinations thereof.

The metal hexacyanoferrates include at least one of Prussian blue, iron hexacyanoferrate (FeHCF), copper hexacyanoferrate (CuHCF), cobalt hexacyanoferrate (CoHCF), nickel hexacyanoferrate (NiHCF) and combinations thereof.

The carbon nanostructures include at least one of carbon nanotube (CNT), graphene, carbon nanoparticle, fullerene, graphite, and combinations thereof. An oxidation-reduction reaction may occur more stably at a higher speed in an electrode electroplated with a composite of an electrode material including carbon nanotubes among the carbon nanostructures.

In addition to this, the electrode material may include various polymers having electrical conductivity or having negative charges.

For example, the above-described electrode material may have a structure in which a plurality of layers are stacked. Further, the electrode material may be coated on the impermeable substrate material by at least one method of drop-coating, dip-coating, spin-coating, spray-coating, printing, pyrolysis and electroplating. Thereafter, each of the surfaces of the coated electrode material in the first electrode 130 and the second electrode 150 may be independently smoothly processed by thermos-compression or decal transfer.

Figure 10:
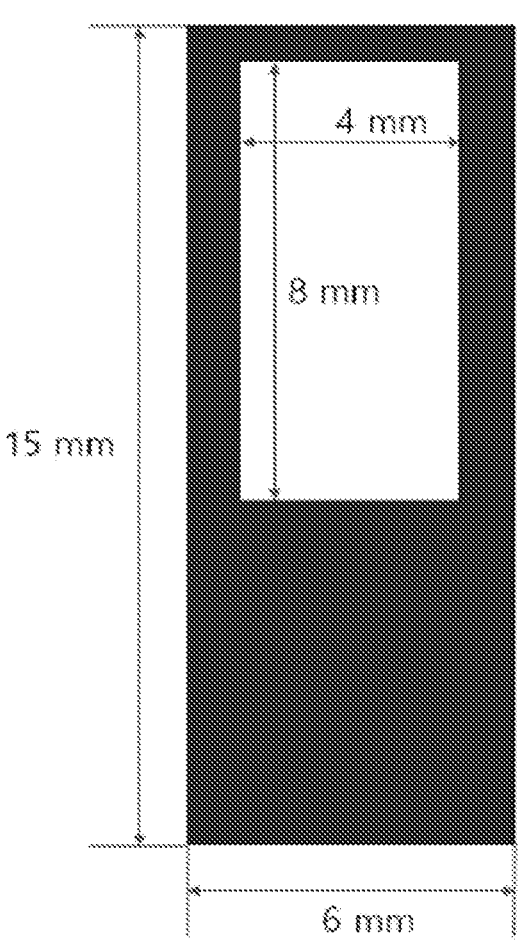
FIG. 10 is a diagram illustrating a Ti plate electrode substrate having a fluid pathway of 4 mm in width and 8 mm in length according to an embodiment of the present disclosure.

In the first electrode 130 and/or the second electrode 150, the ratio of the area of the fluid pathway to the total area of the electrodes 130 and 150 may be greater than 0% to 50% or less (see FIG. 10). For example, the fluid pathway may be formed into a circle, a square or other various shapes, and at least one or more fluid pathways may be formed. Also, the ratio of the area of the fluid pathway to that of the electrodes may be 50% or less.

Figure 2C:
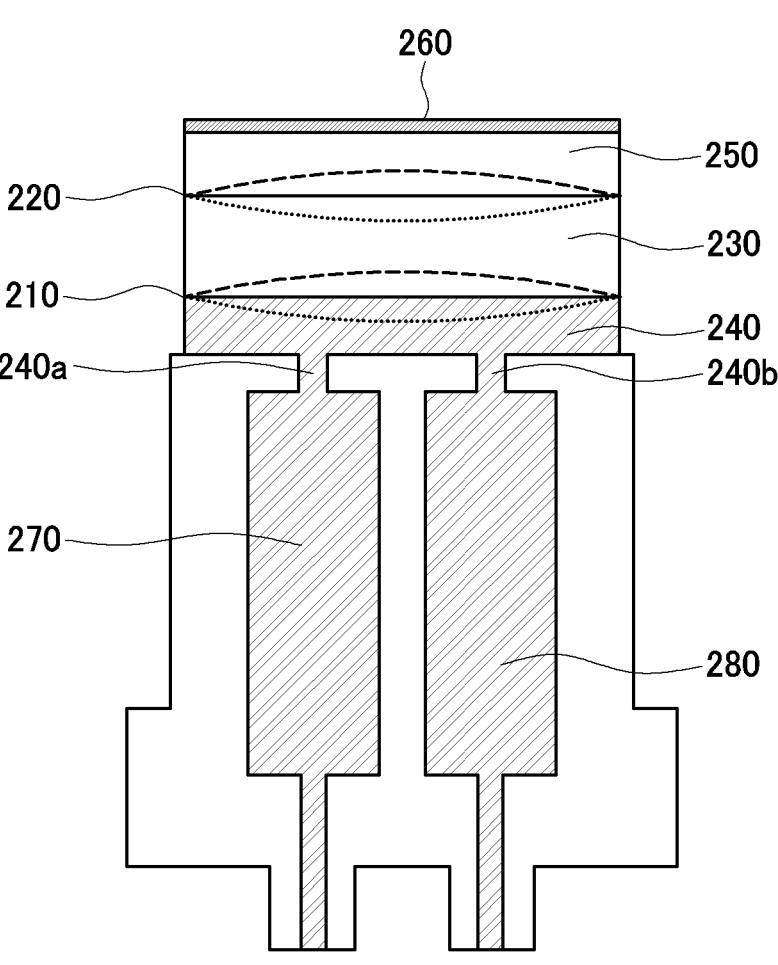
FIG. 2C and FIG. 2D are diagrams illustrating a configuration of a fluid pumping system using the electro-osmotic pump of FIG. 2A according to an embodiment of the present disclosure.
Figure 2D:
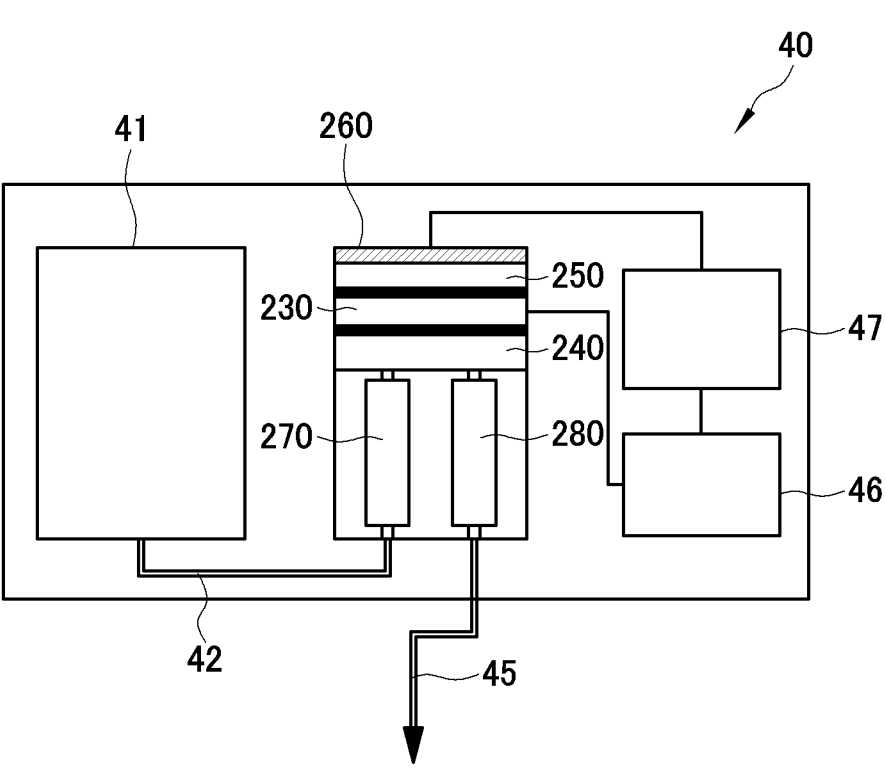

FIG. 2C and FIG. 2D are diagrams illustrating a configuration of a fluid pumping system using the electro-osmotic pump of FIG. 2A according to an embodiment of the present disclosure.

A fluid pumping system 40 of the present disclosure includes the electro-osmotic pump 230, a first separator 210, a second separator 220, a transfer chamber 240, a suction opening 240a, a discharge opening 240b, a monitoring chamber 250, a pressure measuring unit 260, a suction valve 270, a discharge valve 280, a reservoir 41, a suction path 42, a discharge path 45, the power supply unit 46 and a control circuit 47.

Specifically, the fluid pumping system 40 includes the electro-osmotic pump 230, the first separator 210 provided on one side of the electro-osmotic pump 230 and deformed in shape as positive and negative pressures are alternately generated, the transfer chamber 240 provided on one side of the first separator 210 and configured to suck and discharge a transfer target fluid in response to the deformation of the first separator 210, and the second separator 220 provided on the other side of the electro-osmotic pump 230 and deformed in shape as positive and negative pressures are alternately generated.

Further, the suction opening 240a and the discharge opening 240b through which the transfer target fluid is sucked and discharged are formed in one surface of the transfer chamber 240, and the suction opening 240a and the discharge opening 240b are respectively clamped to the suction valve 270 and the discharge valve 280 that allow or block a flow of the transfer target fluid. In this case, the suction valve 270 is closed when a positive pressure is generated and is opened when a negative pressure is generated, and the discharge valve 280 is opened when a positive pressure is generated and is closed when a negative pressure is generated.

For example, as shown in FIG. 2C, the electro-osmotic pump 230 may include at least one component that reciprocates a fluid and/or a gas through an electrochemical reaction, but is not limited thereto. The electro-osmotic pump 230 may be implemented using the electro-osmotic principle that a fluid moves due to electro-osmosis occurring when a voltage is applied to both ends of a capillary or a porous membrane by using electrodes, and unlike mechanical pumps, the electro-osmotic pump is advantageous in that it causes no noise since it has no part that mechanically operates, and can effectively control a flow rate in proportion to the voltage applied.

For example, the separators 210 and 220 are provided on at least one end of the electro-osmotic pump 230 to separate the fluid and the transfer target fluid from each other. The separators 210 and 220 serve to define a space in which the fluid is contained and a space in which the transfer target fluid is contained to suppress mixing of the fluid and the transfer target fluid, and also serve to transfer a pumping force generated by movement of the fluid to the transfer target fluid.

That is, the first and second separators 210 and 220 provided on both sides of the electro-osmotic pump 230 are formed of, as a non-limiting example, a slider, an oil forming an oil gap or natural rubber, synthetic rubber, a polymer material and a metal plate made of a thin film having elasticity. Also, as negative and positive pressures are alternately generated by the operation of the electro-osmotic pump 230, at least a portion of the first and second separators 210 and 220 move forward and backward and transfer the negative and positive pressures to the transfer chamber 240 and the monitoring chamber 250.

For example, the first separator 210 transfers the negative and positive pressures generated by the operation of the electro-osmotic pump 230 to the transfer target fluid. More specifically, when a negative pressure is generated, at least a portion of the first separator 210 moves backward (i.e., a portion of the first separator 210 moves toward the monitoring chamber 250 with reference to FIG. 2C) (indicated by a long-dashed line)) and the transfer target fluid is sucked into the transfer chamber 240. Conversely, when a positive pressure is generated, at least a portion of the first separator 210 moves forward (i.e., a portion of the separator 210 moves toward the transfer chamber 240 with reference to FIG. 2C) (indicated by a short-dashed line)) and the transfer target fluid is discharged from the transfer chamber 240.

In this case, suction and discharge of the transfer target fluid are performed through the suction opening 240a and the discharge opening 240b formed in one surface of the transfer chamber 240. The suction opening 240a and the discharge opening 240b are respectively clamped to the suction valve 270 and the discharge valve 280 that allow or block a flow of the transfer target fluid, and, thus, the transfer target fluid can be sucked through the suction opening 240a and discharged through the discharge opening 240b. In other words, the suction valve 270 is closed when the first separator 210 moves forward and is opened when the first separator 210 moves backward, and the discharge valve 280 is opened when the first separator 210 moves forward and is closed when the first separator 210 moves backward. The suction valve 270 and the discharge valve 280 may be, for example, check valves, but are not limited thereto, and may be opening/closing devices that operate opposite to each other.

The second separator 220, like the first separator 210, repeatedly moves backward and forward by the operation of the electro-osmotic pump 230. Accordingly, due to the movement of the second isolator 220, an air pressure inside the monitoring chamber 250 changes. That is, when a negative pressure is generated, at least a portion of the second separator 220 moves backward (i.e., a portion of the second separator 220 moves toward the monitoring chamber 250 with reference to FIG. 2C) (indicated by a long-dashed line)) and the pressure inside the monitoring chamber 250 is increased. Conversely, when a positive pressure is generated, at least a portion of the second separator 220 moves forward (i.e., a portion of the second separator 220 moves toward the transfer chamber 240 with reference to FIG. 2C) (indicated by a short-dashed line)) and the air pressure inside the monitoring chamber 250 is decreased.

The pressure measuring unit 260 is provided within the monitoring chamber 250 to sense the pressure inside the monitoring chamber 250 and convert it into an electrical signal. For example, the pressure measuring unit 260 may be a pressure sensor that detects a pressure value based on a change in capacity, a change in magnetic force intensity, a resistance or a voltage displacement of the monitoring chamber 250 as the second separator 220 is deformed. Alternatively, the pressure measuring unit 260 may be a pressure sensor that is clamped to the second separator 220 or integrally formed with the second separator 220 to detect a pressure value based on the degree of deformation of the second separator 220. However, the present disclosure is not limited thereto, and the pressure measuring unit 260 may measure the pressure inside the monitoring chamber 250 in various ways.

Also, referring to FIG. 2D, the fluid pumping system 40 includes the components of the electro-osmotic pump shown in FIG. 2C, i.e., the suction path 42 that is a fluid transfer path through which the transfer target fluid discharged from the reservoir 41 in which the transfer target fluid is stored is sucked into the transfer chamber 240, the discharge path 45 that is a fluid transfer path for the transfer target fluid discharged from the transfer chamber 240, the monitoring chamber 250 which is provided on one side of the second separator 220 and whose pressure changes in response to the deformation of the second separator 220, the pressure measuring unit 260 that measures a change in pressure inside the monitoring chamber 250, and the control circuit 47 that monitors the pressure value measured by the pressure measuring unit 260 and detects an abnormality of the electro-osmotic pump 230. The fluid pumping system 40 further includes the power supply 46 that supplies power to the electro-osmotic pump 230 and the control circuit 47.

Both ends of the suction path 42 are clamped to a discharge opening of the reservoir 41 and the suction valve 270 (or the suction opening 240a of the transfer chamber 240), respectively, and the transfer target fluid stored in the reservoir 41 is transferred through the suction path 42 to the transfer chamber 240. The discharge path 45 has one end clamped to the discharge valve 280 (or the discharge opening 240b of the transfer chamber 240) and the other end inserted into a target object and transfers (i.e., injects) the transfer target fluid to the target object. For example, the other end of the discharge path 45 may be a needle, a cannula and/or a catheter.

The reservoir 41 is a storage container formed of a material that can block external gases and ions and configured to store the transfer target fluid, and is clamped to the suction path 42 on its one side and discharges the transfer target fluid in synchronization with the operation of the electro-osmotic pump 230. That is, when a negative pressure is generated by the operation of the electro-osmotic pump 230, the suction valve 270 is opened and the transfer target fluid stored in the reservoir 41 moves to the suction valve 270 through the suction path 42. Conversely, when a positive pressure is generated, the suction valve 270 is closed and the movement of the transfer target fluid is stopped. In this case, the discharge valve 280 is opened, and, thus, the transfer target fluid may be injected into the target object through the discharge path 45 clamped to the discharge valve 280.

Figure 3A:
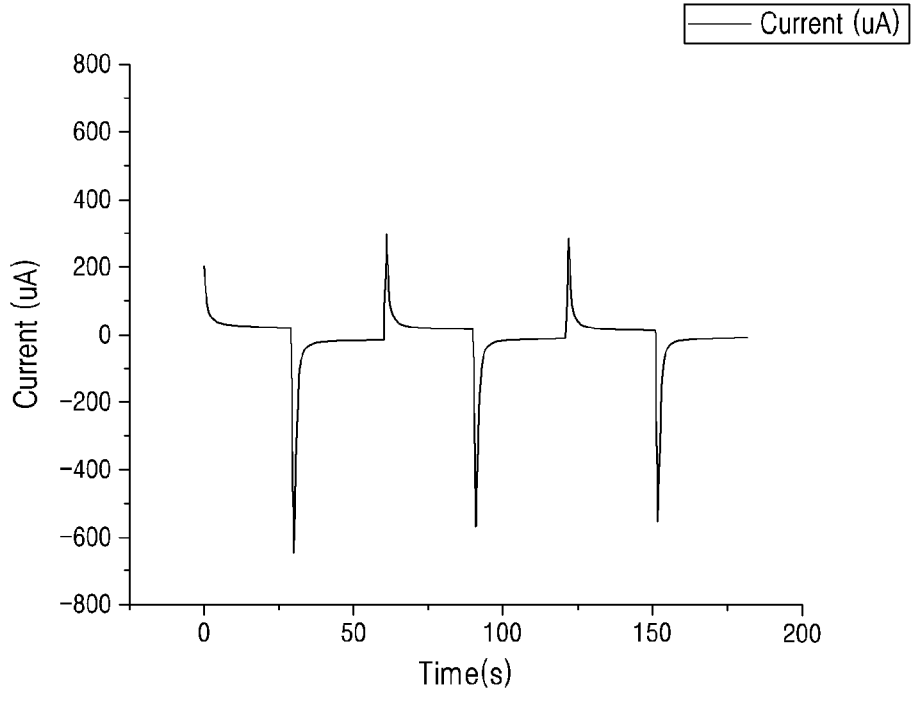
FIG. 3A is a current response graph of an electro-osmotic pump using a Ti plate as an electrode when 2.5 V is applied to both ends of the Ti electrode for 30 seconds
Figure 3B:
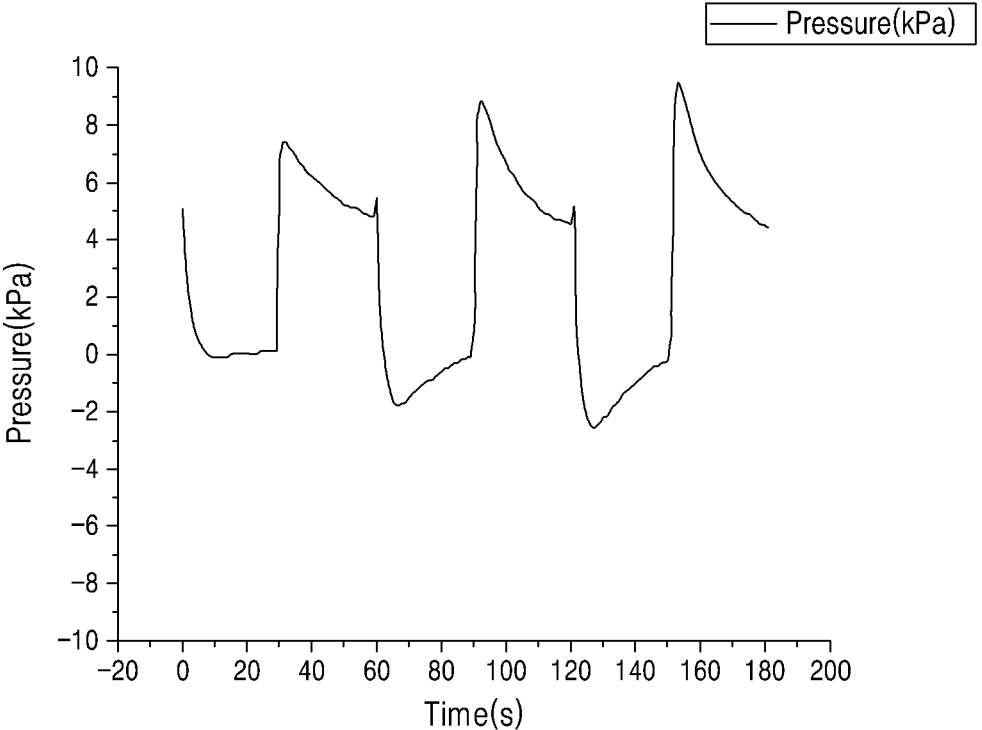
FIG. 3B is a pressure response graph under the same conditions according to an example of the present disclosure.

(Example 2) Check on Whether an Electrode Using an Impermeable Plate-Shaped Substrate Material can be Used in an Electro-Osmotic Pump FIG. 3A is a current response graph of an electro-osmotic pump using a Ti plate as an electrode when 2.5 V is applied to both ends of the Ti electrode for 30 seconds and FIG. 3B is a pressure response graph under the same conditions according to an embodiment of the present disclosure.

Referring to FIG. 3A and FIG. 3B, first, only a titanium plate (Ti plate), which is an impermeable substrate material, was used without coating any other electrode material thereon. Here, the performance of the electro-osmotic pump using the Ti plate was checked to confirm whether a fluid flows through a small fluid pathway of 1 mm and exhibits a pressure (FIG. 3 and Table 1). The electro-osmotic pump was continuously operated in 0.5 mM $Li_2SO_4$ pumping solution with a pulse time of 30 seconds at each of +2.5 V and −2.5 V. The configuration of the electro-osmotic pump for test is the same as shown in FIG. 2A to FIG. 2D, and a porous silica membrane of 2 mm in thickness, 6 mm in width and 10 mm in length was used. Also, a Ti plate of 6 mm in width and 15 mm in length was used as an electrode and substrate.

TABLE 1

| | | | Check of flow rate and pressure of electro-osmotic pump using Ti plate | | | |

| Electrode | Current ($\mu$A) | Flow amount ($\mu$L/ 30 sec) | Pres- sure (kPa) | Flow per power ($\mu$L/mW) |
|---|---|---|---|---|
| Ti plate | 288~11, −550~−9 | 0.6 | 8 | 1.6 |

Referring to Table 1, it can be seen that when the impermeable electrode formed of the Ti plate is used, the fluid can flow but its flow rate or pressure is very insignificant.

(Example 3) Performance Improvement of an Impermeable Electrode Using an Electrode Material and Comparison with a Porous Electrode Although the impermeable substrate material formed of the Ti plate has only one small fluid pathway, the fluid flows and exhibits a pressure. However, the electrode' performance was not good, which means it has a low performance as a pump. Accordingly, the performance of the electrode was improved by additionally coating an electrode material by drop coating in which a predetermined amount of electrode material slurry is dropped and coated by a pipette. The electrode material was coated on a 90° C. hot plate and dried within 20 minutes. For example, $RuO_x$, which is an electrode material, was drop-coated on a Ti plate having a fluid pathway of 1 mm in diameter in the middle. Also, a porous electrode formed of porous carbon paper was constructed by applying $RuO_x$ slurry on a carbon electrode with a brush and drying it in an oven at 110° C. In this case, there was a lot of loss of the electrode material and it was difficult to determine the actual amount of $RuO_x$ coated on the carbon electrode. In order to compare and confirm the performance of these electrodes, they were applied to the electro-osmotic pump. The electro-osmotic pump was continuously operated in 0.5 mM $Li_2SO_4$ pumping solution with a pulse time of 30 seconds at each of +2.5 V and −2.5 V (Table 2). When the electro-osmotic pump for test was constructed, a porous silica membrane of 2 mm in thickness, 6 mm in width and 10 mm in length as shown in FIG. 2A to FIG. 2D was used in the electro-osmotic pump using a Ti plate. Also, a Ti plate of 6 mm in width and 15 mm in length was used as an impermeable electrode and substrate. A $RuO_x$ electrode of 6 mm in width and 10 mm in length was implemented on a porous carbon paper electrode, and a silver strip was used as a contact strip.

TABLE 2

| | | | | Performance of electro-osmotic pump when Ti plate is drop-coated with $RuO_x$ and when carbon paper electrode is coated with $RuO_x$ | | | |

| Electrode | Current ($\mu$A) | Flow amount ($\mu$L/ 30 sec) | Pres- sure (kPa) | Flow per power ($\mu$L/mW) |
|---|---|---|---|---|
| $RuO_x$ on Ti plate | 509~364, −469~−375 | 12.7 | 193 | 11.6 |
| $RuO_x$ on carbon paper | 811~637, −820~−591 | 17.5 | 170 | 9.7 |

Referring to Tables 1 and 2, it can be seen that the Ti plate coated with the efficient electrode material (upper stage of Table 2) is greatly improved in the performance of the electro-osmotic pump, i.e., flow rate/power and pressure compared to the Ti plate only (Table 1).

Further, it can be seen that the electrode using the Ti plate exhibits a higher pressure and flow rate/power compared to the electrode implemented on the porous carbon paper electrode (lower stage of Table 2). That is, it can be seen that the performance of the pump is improved by coating the efficient electrode material.

While the electrode material is coated on the porous carbon paper electrode with a brush, the electrode material may pass through a porous flow path in the substrate material and the coating amount of the electrode material cannot be made constant. However, when drop-coating is performed on the Ti plate using a pipette, an efficient and reproducible electrode can be manufactured using a predetermined amount of the electrode material. Further, compared to the easily brittle carbon paper electrode, a high-strength electrode can be implemented by using the Ti plate. Furthermore, the Ti plate, which is a substrate material and electrical conductor can be used as an electrical contact without the need for a separate electrical contact, and, thus, the configuration can be simplified.

Figure 4A:
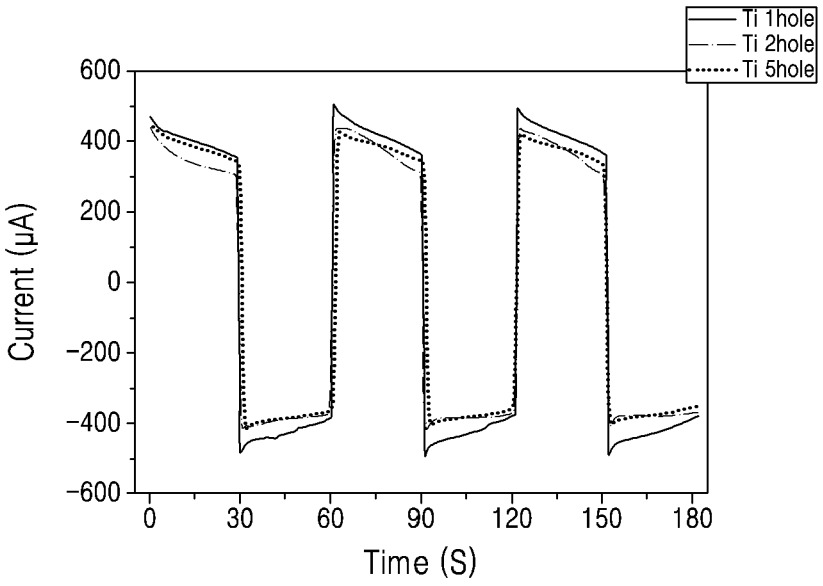
FIG. 4A is a current response graph of an electro-osmotic pump using a Ti plate with $RuO_x$ drop-coated thereon as an electrode having 1, 2 or 5 fluid pathways when 2.5 V is applied to both ends of the electrode for 30 seconds
Figure 4B:
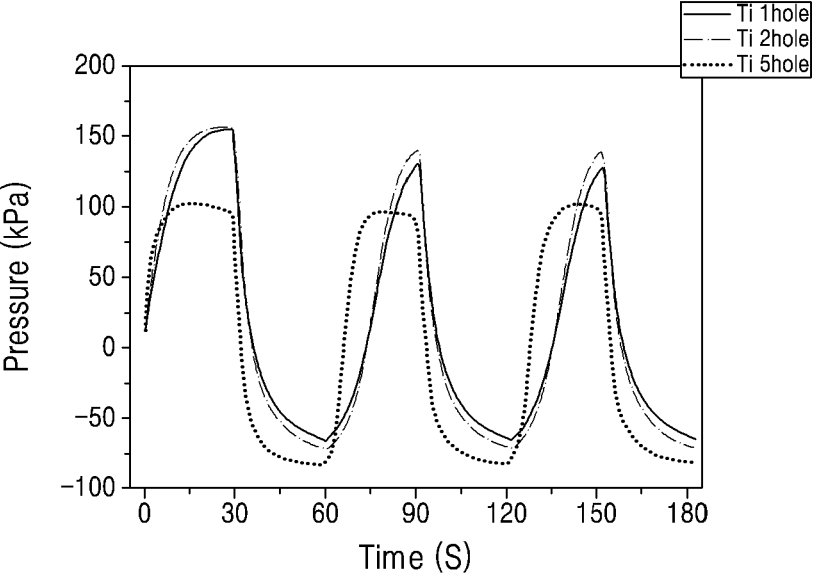
FIG. 4B is a pressure response graph under the same conditions according to an example of the present disclosure.

(Example 4) Comparison in Performance of an Electro-Osmotic Pump Depending on the Number of Fluid Pathways in an Impermeable Electrode FIG. 4A is a current response graph of an electro-osmotic pump using a Ti plate with $RuO_x$ drop-coated thereon as an electrode having 1, 2 or 5 fluid pathways when 2.5 V is applied to both ends of the electrode for 30 seconds and FIG. 4B is a pressure response graph under the same conditions according to an embodiment of the present disclosure.

In order to check the amount of the fluid depending on the number of fluid pathways in the impermeable electrode, Ti plates with different fluid pathways were compared. Specifically, after one, two and five 1 mm holes through which the fluid can move were formed in the respective Ti plates, the electrodes drop-coated with $RuO_x$ slurry were applied to the electro-osmotic pump and their performance was checked (FIG. 4A, FIG. 4B and Table 3). The electro-osmotic pump was continuously operated in 0.5 mM $Li_2SO_4$ pumping solution with a pulse time of 30 seconds at each of +2.5 V and −2.5 V. When the electro-osmotic pump for test was constructed, a porous silica membrane of 2 mm in thickness, 6 mm in width and 10 mm in length as shown in FIG. 2A to FIG. 2D was used. Also, a Ti plate of 6 mm in width and 15 mm in length was used as an electrode and substrate.

TABLE 3

| | | Flow | | |
| | | amount | Pres- | Flow |
| | Current | ($\mu$L/ | sure | per power |
| Electrode | ($\mu$A) | 30 sec) | (kPa) | ($\mu$L/mW) |
| --- | --- | --- | --- | --- |
| 1 hole | 509~364, −469~−375 | 12.7 | 193 | 11.6 |
| 2 hole | 491~330, −480~−377 | 13.2 | 211 | 12.9 |
| 5 hole | 455~307, −425~−366 | 13.3 | 180 | 14.0 |

*Performance of electro-osmotic pump depending on number of fluid pathways in impermeable electrode*

Referring to Table 3, when the Ti plates having different numbers of fluid pathway therein were compared in terms of performance, the efficiency was slightly higher in the Ti plate having five fluid pathways but not much different from that in the Ti plate having one fluid pathway, and the performance of the pump was similar to that of a conventional pump. Accordingly, it was confirmed that there is no significant difference in the performance of the electro-osmotic pump even if there is only one small pathway through which the fluid can move without using a large number of fluid paths.

Figure 5A:
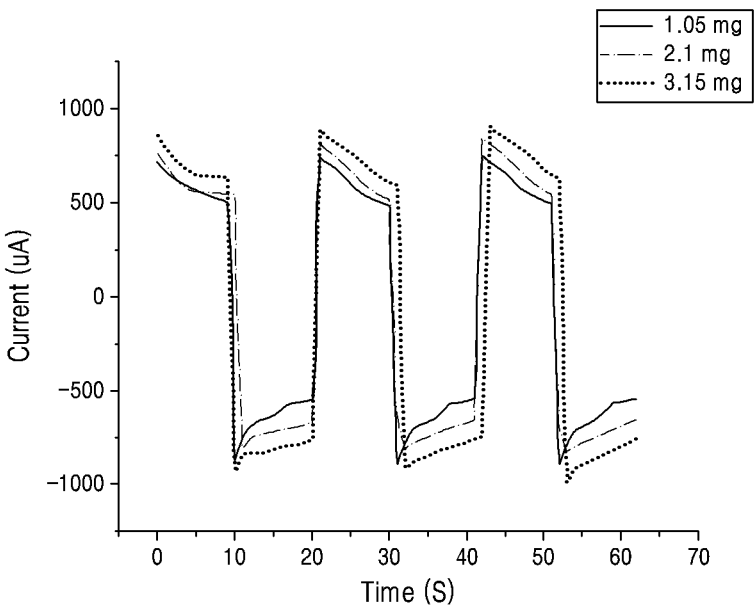
FIG. 5A is a current response graph of an electro-osmotic pump using a Ti plate with 1.05 mg, 2.10 mg or 3.15 mg of $RuO_x$ drop-coated thereon as an electrode when 2.5 V is applied to both ends of the electrode for 10 seconds
Figure 5B:
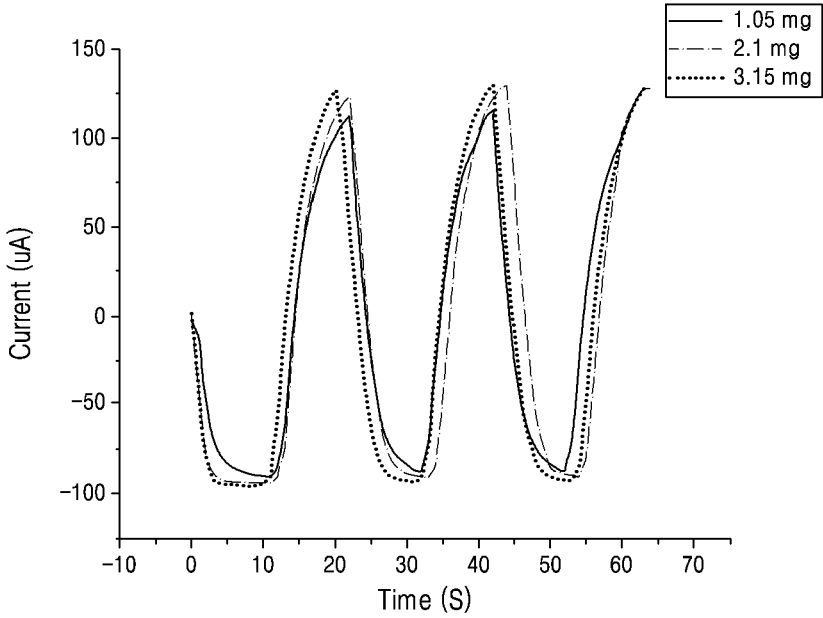
FIG. 5B is a pressure response graph under the same conditions according to an example of the present disclosure.

(Example 5) Performance of an RuO$_x$-Based Impermeable Electrode Depending on the Coating Amount FIG. 5A is a current response graph of an electro-osmotic pump using a Ti plate with 1.05 mg, 2.10 mg or 3.15 mg of RuO$_x$ drop-coated thereon as an electrode when 2.5 V is applied to both ends of the electrode for 10 seconds and FIG. 5B is a pressure response graph under the same conditions according to an embodiment of the present disclosure.

Referring to FIG. 5A and FIG. 5B, it was confirmed from Example 4 that drop-coating on the impermeable plate-shaped substrate material can be performed in a constant amount. Accordingly, the amount of the electrode material on an electrode can be adjusted. In order to check whether the performance of an electrode can be controlled by adjusting the amount of the electrode material, the coating amount of the electrode material on the impermeable substrate material was varied and the electrodes were compared in terms of performance. For example, electrodes were manufactured by coating 1.05 mg, 2.10 mg and 3.15 mg of RuO$_x$ on respective Ti plates of 6 mm in width and 15 mm in length. In order to check the performance of the electrodes, the electrodes were applied to the electro-osmotic pump (FIG. 5A, FIG. 5B, and Table 4). The electro-osmotic pump was continuously operated in 0.5 mM Li$_2$SO$_4$ pumping solution with a pulse time of 10 seconds at each of +2.5 V and −2.5 V. When the electro-osmotic pump for test was constructed, a porous silica membrane of 2 mm in thickness, 6 mm in width and 10 mm in length as shown in FIG. 2A to FIG. 2D was used.

TABLE 4

| | | Flow | | |
| | | amount | Pres- | Flow |
| | Current | ($\mu$L/ | sure | per power |
| Electrode | ($\mu$A) | 10 sec) | (kPa) | ($\mu$L/mW) |
| --- | --- | --- | --- | --- |
| 1.05 mg RuO$_x$ | 750~494, −893~−541 | 6 | 198 | 3.9 |
| 2.10 mg RuO$_x$ | 876~559, −946~−626 | 6.4 | 218 | 3.6 |
| 3.15 mg RuO$_x$ | 1015~614, −990~−657 | 7 | 222 | 3.4 |

*Performance of electro-osmotic pump when Ti plate is drop-coated with different amounts of RuO$_x$*

Referring to Table 4, when the Ti plates were coated with different the amounts of RuO$_x$, the current and flow rate increased as the amount of the electrode material increased. Accordingly, it was confirmed that the performance of the electrode can be controlled by quantitatively varying the amount of the electrode material coated on the impermeable substrate material.

(Example 6) MnO$_x$-Based Impermeable Electrode

Figure 6A:
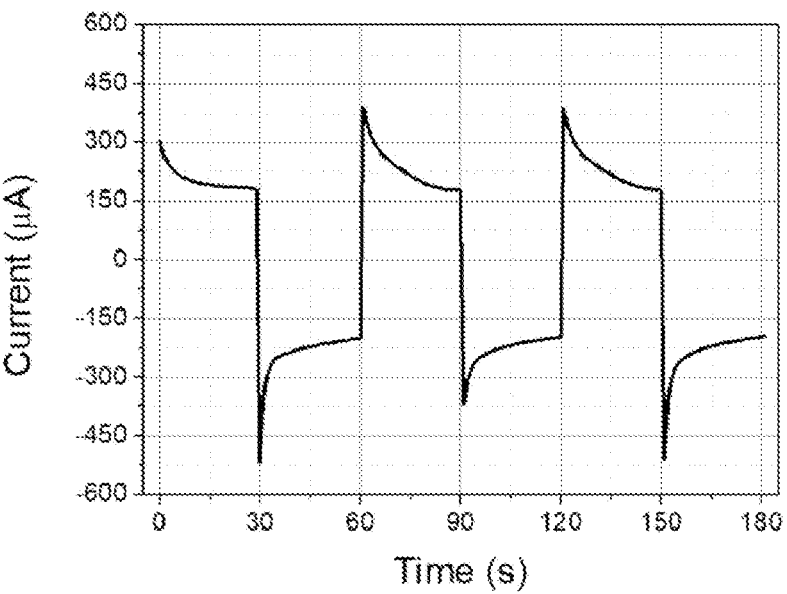
FIG. 6A is a current response graph of an electro-osmotic pump using a Ti plate with $MnO_x$ drop-coated thereon as an electrode when 2.5 V is applied to both ends of the electrode for 30 seconds
Figure 6B:
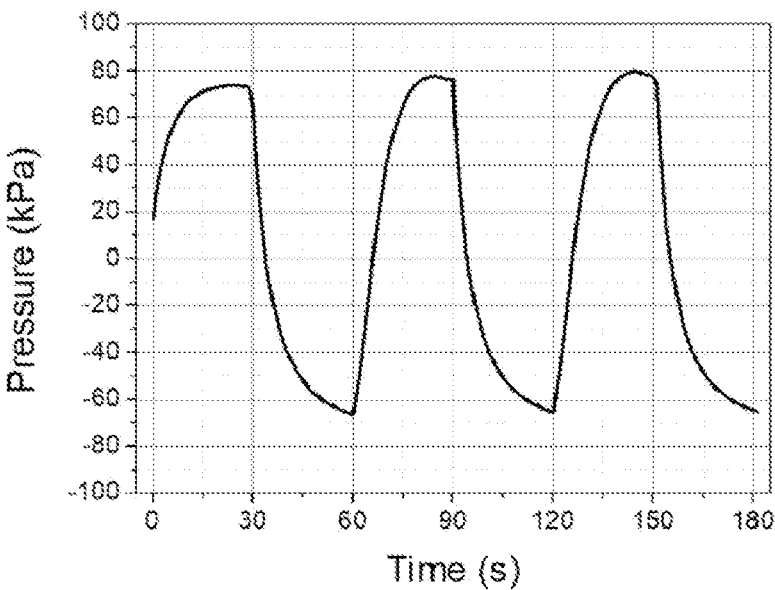
FIG. 6B is a pressure response graph under the same conditions according to an example of the present disclosure.

FIG. 6A is a current response graph of an electro-osmotic pump using a Ti plate with MnO$_x$ drop-coated thereon as an electrode when 2.5 V is applied to both ends of the electrode for 30 seconds and FIG. 6B is a pressure response graph under the same conditions according to an embodiment of the present disclosure.

Referring to FIG. 6A and FIG. 6B, as described above, the impermeable plate-shaped substrate material having a small fluid pathway can be coated with various electrode materials thereon and then can be applied to the electro-osmotic pump. It was previously confirmed from Example 4 that RuO$_x$ can be coated. In another example, an impermeable Ti plate was drop-coated with MnO$_x$ and then applied to the electro-osmotic pump to check the performance (FIG. 6A, FIG. 6B and Table 5). The electro-osmotic pump was continuously operated in 0.5 mM Li$_2$SO$_4$ pumping solution with a pulse time of 30 seconds at each of +2.5 V and −2.5 V. When the electro-osmotic pump for test was constructed, a porous silica membrane of 2 mm in thickness, 6 mm in width and 10 mm in length as shown in FIG. 2A to FIG. 2D was used. Also, a Ti plate of 6 mm in width and 15 mm in length was used as an electrode and substrate.

TABLE 5

| | | Flow | | |
| | | amount | Pres- | Flow |
| | Current | ($\mu$L/ | sure | per power |
| Electrode | ($\mu$A) | 30 sec) | (kPa) | ($\mu$L/mW) |
| --- | --- | --- | --- | --- |
| MnO$_2$ | 386~179, −509~−196 | 7.0 | 135 | 9.9 |

*Performance of electro-osmotic pump when Ti plate is drop-coated with MnO$_x$*

Referring to Table 5, it was confirmed that the performance of the electro-osmotic pump based on MnO$_x$ was implemented when the electrode was manufactured by coating MnO$_x$ on an impermeable metal substrate material and applied to the electro-osmotic pump to check the performance. That is, it was confirmed that various electrode materials can be coated on the impermeable substrate material.

(Example 7) Metal Hexacyanoferrate-Based
Impermeable Electrode

Figure 7A:
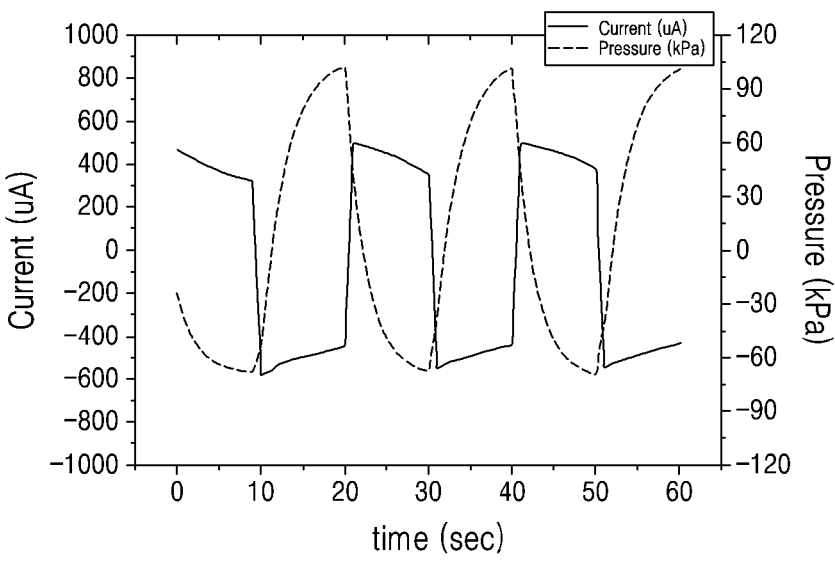
FIG. 7A is a current and pressure response graph of an electro-osmotic pump using a Ti plate with iron(III) hexacyanoferrate(II) drop-coated thereon as an electrode when 2.5 V is applied to both ends of the electrode for 10 seconds
Figure 7B:
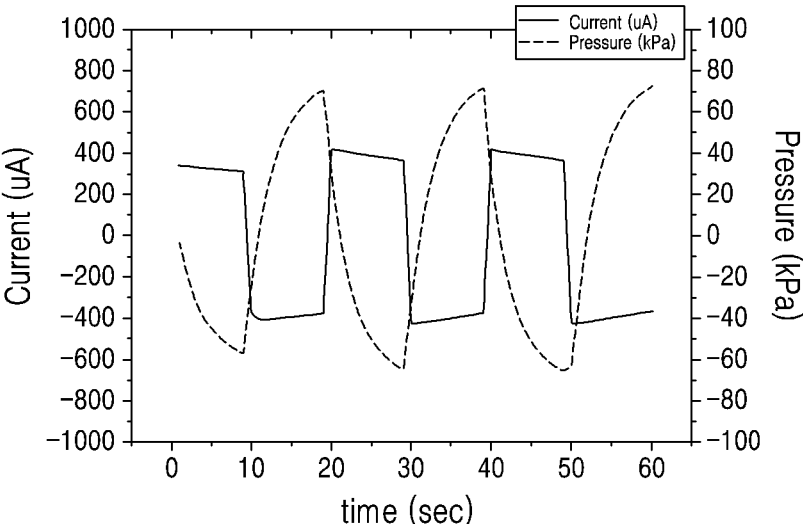
FIG. 7B is a current and pressure response graph of an electro-osmotic pump using a Ti plate with NiHCF drop-coated thereon as an electrode when 2.5 V is applied to both ends of the electrode for 10 seconds according to an example of the present disclosure.

FIG. 7A is a current and pressure response graph of an electro-osmotic pump using a Ti plate with iron(III) hexacyanoferrate(II) drop-coated thereon as an electrode when 2.5 V is applied to both ends of the electrode for 10 seconds and FIG. 7B is a current and pressure response graph of an electro-osmotic pump using a Ti plate with NiHCF drop-coated thereon as an electrode when 2.5 V is applied to both ends of the electrode for 10 seconds according to an embodiment of the present disclosure.

Referring to FIG. 7A and FIG. 7B, electrodes were manufactured by drop-coating iron(III) hexacyanoferrate(II) (PB), which is one of metal hexacyanoferrates, and NiHCF on respective Ti plates in order to check the performance by coating various electrode materials on an impermeable substrate material. The electrode was prepared by coating. In order to check the performance of the electrodes, they were applied to the electro-osmotic pump (FIG. 7A, FIG. 7B and Table 6). The electro-osmotic pump was continuously operated in 0.5 mM $CH_3COOK$ pumping solution with a pulse time of 10 seconds at each of +2.5 V and −2.5 V. When the electro-osmotic pump for test was constructed, a porous silica membrane of 2 mm in thickness, 6 mm in width and 10 mm in length as shown in FIG. 2A to FIG. 2D was used. Also, a Ti plate of 6 mm in width and 15 mm in length was used as an electrode and substrate.

TABLE 6

Performance of electro-osmotic pump when Ti plate
is drop-coated with each of PB (iron(III) hexacyanoferrate(II))
and NiHCF (nickel hexacyanoferrate)

| Electrode | Current (μA) | Flow amount (μL/ 10 sec) | Pres- sure (kPa) | Flow per power (μL/mW) |
|---|---|---|---|---|
| PB on Ti plate | 542~438 | 5.6 | 170.3 | 4.6 |
| NiHCF on Ti plate | 418~365 | 3 | 138 | 3.1 |

Referring to Table 6, it was confirmed that iron(III) hexacyanoferrate(II) and NiHCF coated on the respective Ti plates function as electrode materials. That is, it was confirmed that a function depending on the type of an electrode material on an impermeable plate-shaped metal substrate material can be implemented by coating various electrode materials on the substrate material compared to the porous substrate material (e.g., carbon paper electrode) with limitation in use of electrode materials that can be coated thereon.

(Example 8) $IrO_x$-Based Impermeable Electrode

Figure 8A:
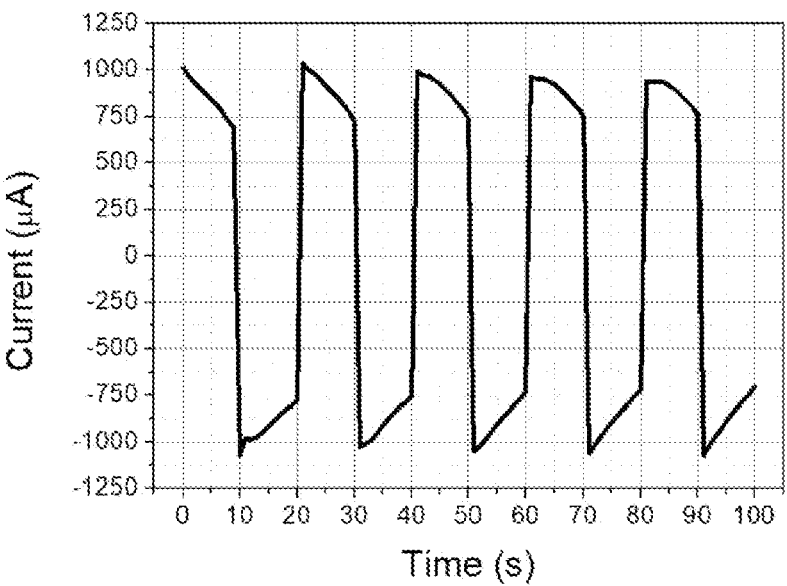
FIG. 8A is a current response graph of an electro-osmotic pump using a Ti plate with $IrO_x$ spray-coated thereon as an electrode when 2.5 V is applied to both ends of the electrode for 10 seconds
Figure 8B:
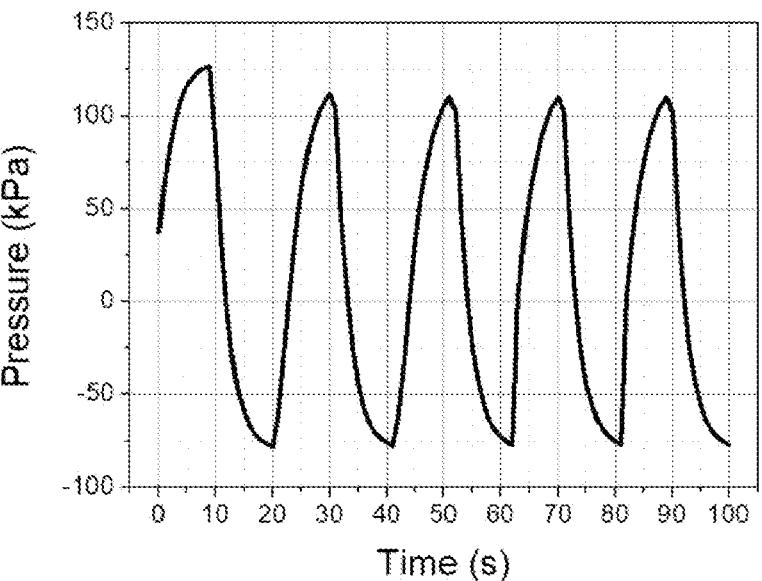
FIG. 8B is a pressure response graph under the same conditions according to an example of the present disclosure.

FIG. 8A is a current response graph of an electro-osmotic pump using a Ti plate with $IrO_x$ spray-coated thereon as an electrode when 2.5 V is applied to both ends of the electrode for 10 seconds and FIG. 8B is a pressure response graph under the same conditions according to an embodiment of the present disclosure.

Referring to FIG. 8A and FIG. 8B, an electrode material can be coated on an impermeable plate-shaped metal substrate material by various coating methods. An $IrO_x$-based impermeable electrode was used as an example of an impermeable electrode coated with an electrode material by spraying. After $IrCl_3$ and a small amount of $TaCl_3$ were sprayed onto a Ti substrate, $IrO_x$ was generated by pyrolysis and a small fluid pathway was formed in the middle of the substrate. In order to check the performance of the electrode, it was applied to the electro-osmotic pump (FIG. 8A, FIG. 8B and Table 7). The electro-osmotic pump was continuously operated in 0.1 mM $Li_2SO_4$ pumping solution with a pulse time of 10 seconds at each of +2.5 V and −2.5 V. When the electro-osmotic pump for test was constructed, a porous silica membrane of 2 mm in thickness, 6 mm in width and 10 mm in length as shown in FIG. 2A to FIG. 2D was used. Also, a Ti plate of 6 mm in width and 15 mm in length was used as an electrode and substrate.

TABLE 7

Performance of electro-osmotic pump using
$IrO_x$-based impermeable electrode

| Electrode | Current (μA) | Flow amount (μL/ 10 sec) | Pres- sure (kPa) | Flow per power (μL/mW) |
|---|---|---|---|---|
| IrOx on Ti plate | 961~752, −1063~−720 | 5.0 | 186 | 2.3 |

Referring to Table 7, it was confirmed that the electrode manufactured by a coating method such as spraying also showed good performance in the electro-osmotic pump. That is, it was confirmed that electrodes manufactured by various coating methods can be applied to the electro-osmotic pump. Also, it was confirmed that $IrO_x$ coated on the Ti plate functions as an electrode material.

Figure 9A:
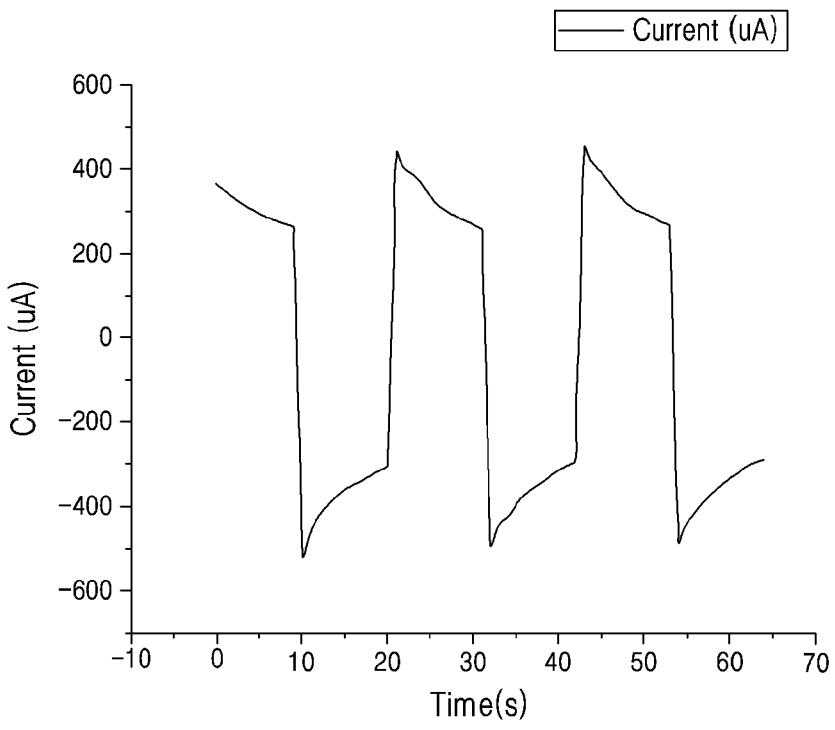
FIG. 9A is a current response graph of an electro-osmotic pump using a Ti plate with $RuO_x$ drop-coated thereon as an electrode when 2.5 V is applied to both ends of the electrode for 10 seconds
Figure 9B:
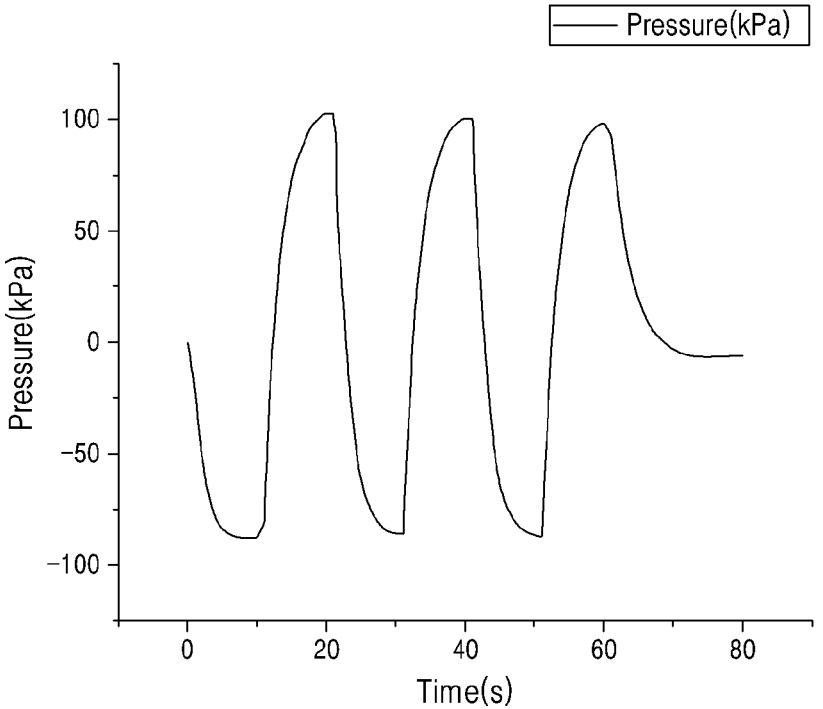
FIG. 9B is a pressure response graph under the same conditions according to an embodiment of the present disclosure.

(Example 9) Utilization of an $RuO_x$-Based
Impermeable Electrode Using Electroplating FIG. 9A is a current response graph of an electro-osmotic pump using a Ti plate with $RuO_x$ electroplated thereon as an electrode when 2.5 V is applied to both ends of the electrode for 10 seconds and FIG. 9B is a pressure response graph under the same conditions according to an embodiment of the present disclosure.

Referring to FIG. 9A and FIG. 9B, an electrode can be produced by electroplating on an impermeable electrode, and this can be applied to the electro-osmotic pump. For example, the performance of the electro-osmotic pump was checked by electroplating $RuO_x$ on a Ti plate to manufacture an electrode (FIG. 9A, FIG. 9B and Table 8). The electro-osmotic pump was continuously operated in 0.5 mM $Li_2SO_4$ pumping solution with a pulse time of 10 seconds at each of +2.5 V and −2.5 V. When the electro-osmotic pump for test was constructed, a porous silica membrane of 2 mm in thickness, 6 mm in width and 10 mm in length as shown in FIG. 2A to FIG. 2D was used. Also, a Ti plate of 6 mm in width and 15 mm in length was used as an electrode and substrate.

TABLE 8

| | | Flow amount (µL/ 10 sec) | Pres- sure (kPa) | Flow per power (µL/mW) |
|---|---|---|---|---|
| | Performance of electro-osmotic pump when Ti plate is electroplated with RuO$_x$ | | | |
| Electrode | Current (µA) | | | |
| RuO$_x$ on Ti plate | 457~267, −487~−287 | 6.0 | 186 | 6.6 |

Referring to Table 8, it was confirmed that the imperme-able electrode manufactured by electroplating can be applied to the electro-osmotic pump. That is, it was confirmed that various coating methods can be used to manufacture the electrodes of the electro-osmotic pump.

(Example 10) Performance of an Electro-Osmotic Pump Depending on the Shape and Size of a Space in an Impermeable Electrode FIG. 10 is a diagram illustrating a Ti plate electrode substrate having a fluid pathway of 4 mm in width and 8 mm in length according to an embodiment of the present disclo-sure.

Figure 11A:
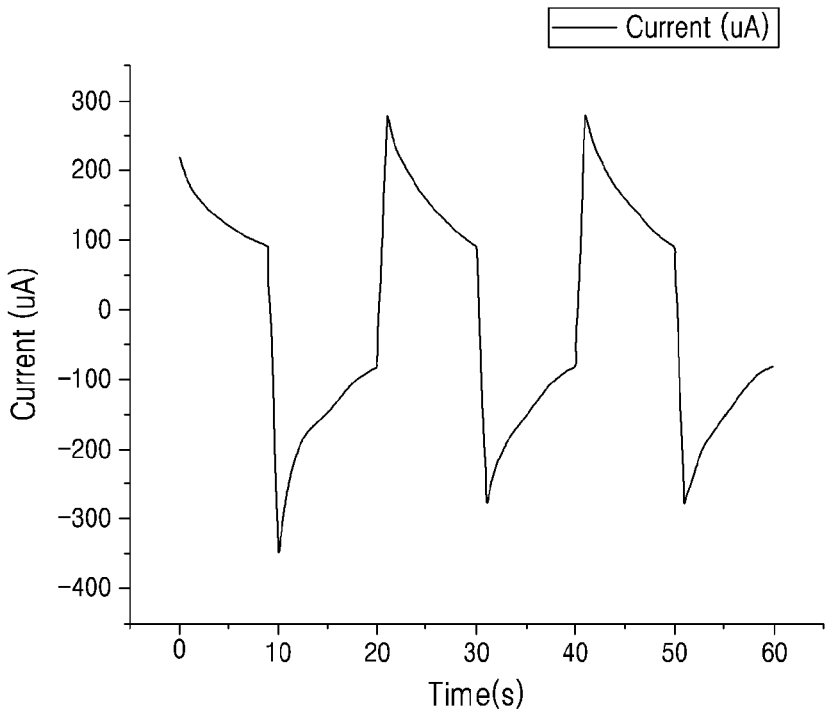
FIG. 11A is a current response graph of an electro-osmotic pump using a Ti plate having a large fluid pathway with $RuO_x$ electroplated thereon as an electrode when 2.5 V is applied to both ends of the electrode for 10 seconds
Figure 11B:
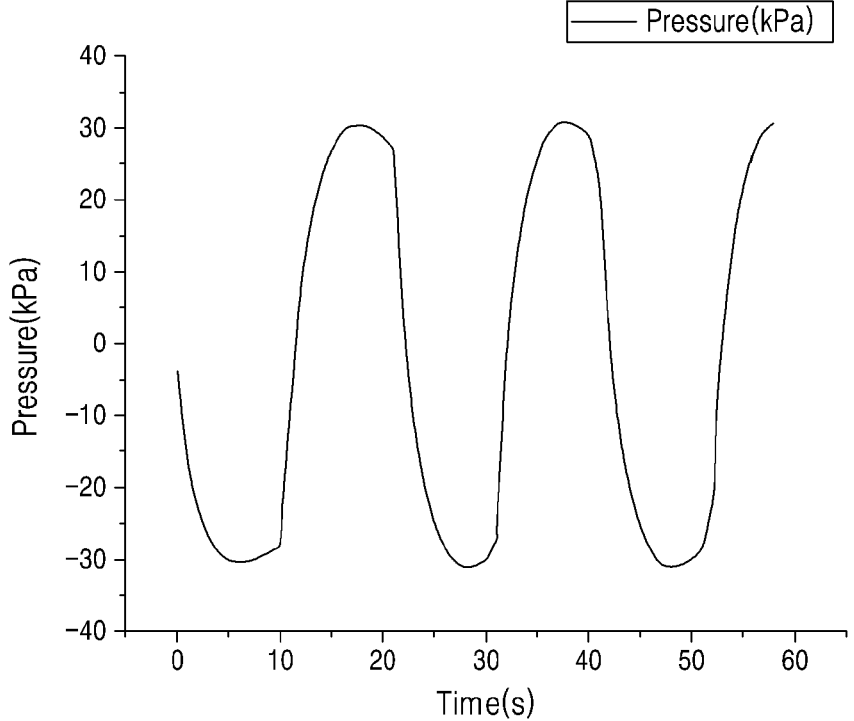
FIG. 11B is a pressure response graph under the same conditions according to an example of the present disclosure.

FIG. 11A is a current response graph of an electro-osmotic pump using a Ti plate having a large fluid pathway with RuO$_x$ electroplated thereon as an electrode when 2.5 V is applied to both ends of the electrode for 10 seconds and FIG. 11B is a pressure response graph under the same conditions according to an embodiment of the present disclosure.

Referring to FIG. 10, the performance of the electro-osmotic pump depending on the number of fluid pathways in the impermeable electrode was compared as in Example 4. An electrode having only one large flow pathway was manufactured in addition to a method of securing a flow path by increasing the number of small fluid pathways of 1 mm in diameter. For example, in order to check the performance of the electrode, a fluid pathway of 4 mm in width and 8 mm in length was formed in a Ti plate of 6 mm in width and 15 mm in length, and then RuO$_x$ was electroplated thereon (FIG. 10).

Referring to FIG. 11A and FIG. 11B, the performance was checked by applying the manufactured electrode to the electro-osmotic pump (FIG. 11A, FIG. 11B and Table 9). The electro-osmotic pump was continuously operated in 0.5 mM Li$_2$SO$_4$ pumping solution with a pulse time of 10 seconds at each of +2.5 V and −2.5 V. When the electro-osmotic pump for test was constructed, a porous silica membrane of 2 mm in thickness, 6 mm in width and 10 mm in length as shown in FIG. 2A to FIG. 2D was used.

TABLE 9

| | | Flow amount (µL/ 10 sec) | Pres- sure (kPa) | Flow per power (µL/mW) |
|---|---|---|---|---|
| | Performance of electro-osmotic pump with impermeable electrode having single large fluid pathway | | | |
| Electrode | Current (µA) | | | |
| RuO$_x$ on 4 × 8 hole Ti plate | 295~85, −281~−84 | 1.6 | 62 | 3.4 |

Referring to Table 9, it was confirmed that the electrode having a large fluid pathway of 4 mm in width and 8 mm in length exhibits a small flow rate and pressure about half the performance of a conventional electrode having a fluid pathway of 1 mm in diameter, but it functions as an electro-osmotic pump. There is a difference in performance depending on the sizes of electrodes using an impermeable substrate material having a fluid pathway (actually depend-ing on the areas of electrodes used), but regardless of their sizes, they can secure a flow path as well as function as electrodes.

Figure 12A:
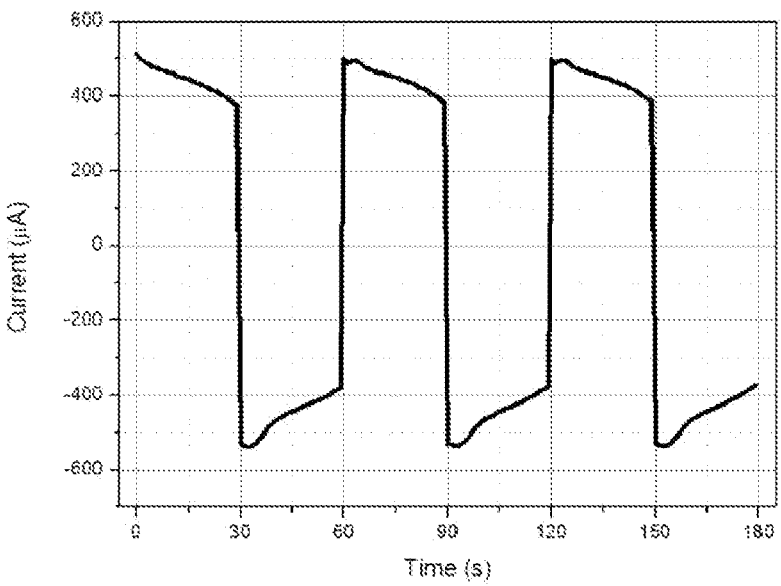
FIG. 12A is a current response graph of an electro-osmotic pump using a Ti plate with $RuO_x$ drop-coated thereon as an electrode when 2.5 V is applied to both ends of the electrode for 30 seconds
Figure 12B:
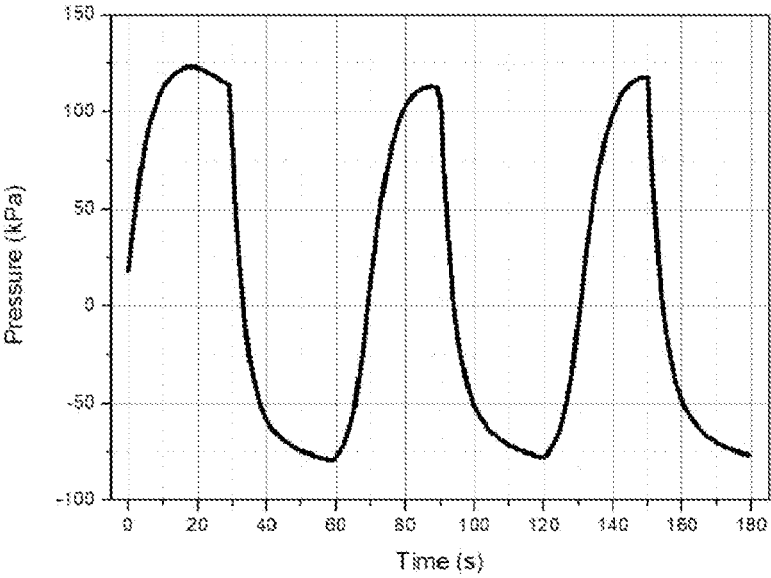
FIG. 12B is a pressure response graph under the same conditions according to an example of the present disclosure.

(Example 11) Performance of an Electrode Using Various Plate-Shaped Substrate Materials FIG. 12A is a current response graph of an electro-osmotic pump using a Ti plate with RuO$_x$ drop-coated thereon as an electrode when 2.5 V is applied to both ends of the electrode for 30 seconds and FIG. 12B is a pressure response graph under the same conditions according to an embodiment of the present disclosure.

Figure 13A:
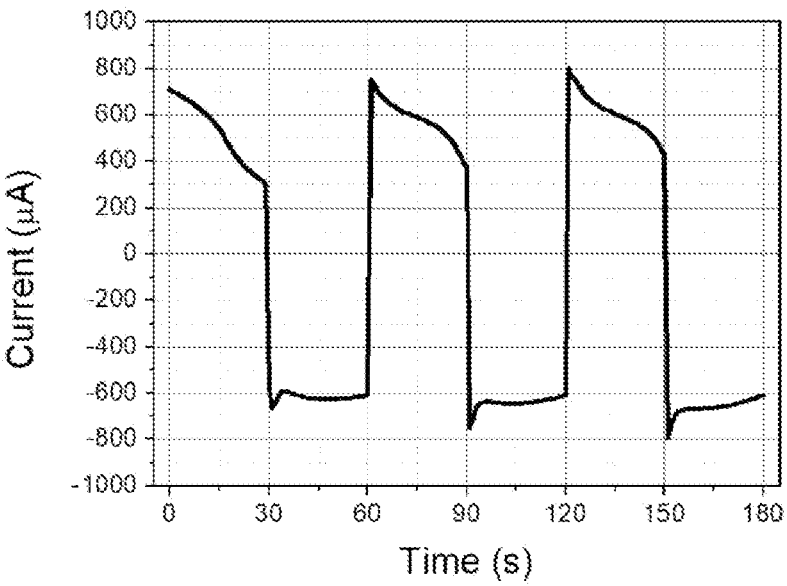
FIG. 13A is a current response graph of an electro-osmotic pump using a Ni plate with $RuO_x$ drop-coated thereon as an electrode when 2.5 V is applied to both ends of the electrode for 30 seconds
Figure 13B:
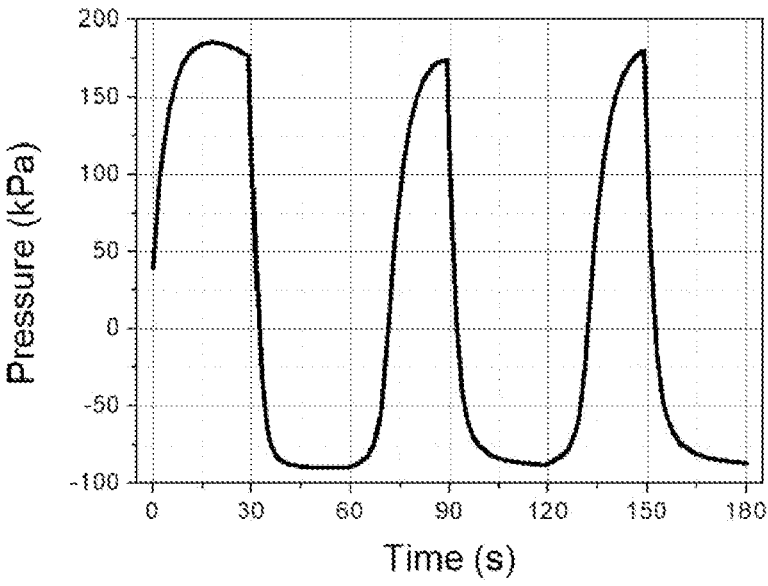
FIG. 13B is a pressure response graph under the same conditions according to an example of the present disclosure.

FIG. 13A is a current response graph of an electro-osmotic pump using a Ni plate with RuO$_x$ drop-coated thereon as an electrode when 2.5 V is applied to both ends of the electrode for 30 seconds and FIG. 13B is a pressure response graph under the same conditions according to an embodiment of the present disclosure.

Referring to FIG. 12A to FIG. 13B, electrodes were manufactured using various types of metal plate-shaped substrate materials and applied to the electro-osmotic pump. For example, Ti is a very stable material with excellent corrosion resistance. Therefore, it is easy to check only the desired reaction, and, thus, Ti was used as a substrate material for an electro-osmotic pump. Also, an electrode was manufactured using a nickel plate, which is another metal substrate material. Electrodes manufactured using various metal substrate materials were applied to the electro-osmotic pump to check the performance (FIG. 11A to FIG. 12B, Table 9). The electro-osmotic pump was continuously oper-ated in 0.5 mM Li$_2$SO$_4$ pumping solution with a pulse time of 30 seconds at each of +2.5 V and −2.5 V. When the electro-osmotic pump for test was constructed, a porous silica membrane of 2 mm in thickness, 6 mm in width and 10 mm in length as shown in FIG. 2A to FIG. 2D was used. Also, a Ti plate of 6 mm in width and 15 mm in length was used as an electrode and substrate.

TABLE 10

| | | Flow amount (µL/ 30 sec) | Pres- sure (kPa) | Flow per power (µL/mW) |
|---|---|---|---|---|
| | Performance of electro-osmotic pump when various metal substrate materials are drop-coated with RuO$_x$ | | | |
| Electrode | Current (µA) | | | |
| RuO$_x$ on Ti plate | 498~383, −535~−376 | 11 | 195 | 10.0 |
| RuO$_x$ on Ni plate | 752~374, −752~−609 | 15.4 | 266 | 10.9 |

Referring to Table 10, it was confirmed that both the Ti plate and the Ni plate are in the form of electrodes through which a fluid can flow in the electro-osmotic pump. Elec-trodes were manufactured using various impermeable plate-shaped metal substrate materials, and it was checked whether they can be applied to the electro-osmotic pump. That is, it was confirmed that the electro-osmotic pump can be constructed in the same way by coating an electrode material on a conductor as a substrate material.

(Example 12) Electrode Using
Thermos-Compression

FIG. 14A illustrates an electrode in which RuO$_x$ is drop-coated but not thermo-compressed on a Ti plate, FIG. 14B and FIG. 14C illustrate an electrode in which RuO$_x$ is drop-coated on a Ti plate and then thermo-compressed thereon by using a thermo-compressor according to an embodiment of the present disclosure.

Referring to FIG. 14A to FIG. 14C, as compared to a conventional porous electrode, the plate-shaped electrode is not easily deformed by external stimuli due to its rigidity. Therefore, thermos-compression that can make an electrode surface smooth at high temperature and pressure was employed to manufacture an electrode. For example, an electrode was prepared by drop-coating RuO$_x$ on a Ti plate, followed by thermos-compression at a pressure of 20 MPa and a temperature of 100° C. for 10 minutes to check the degree of deformation of the electrode.

It was confirmed that the shape of the electrode substrate was maintained despite external stimuli of high temperature and high pressure and the surface of the electrode material can be made smooth. An electrode manufactured using a thermos-compressor was applied to the electro-osmotic pump to check the performance of the electrode (FIG. 14A to FIG. 14C, and Table 10).

Figure 15A:
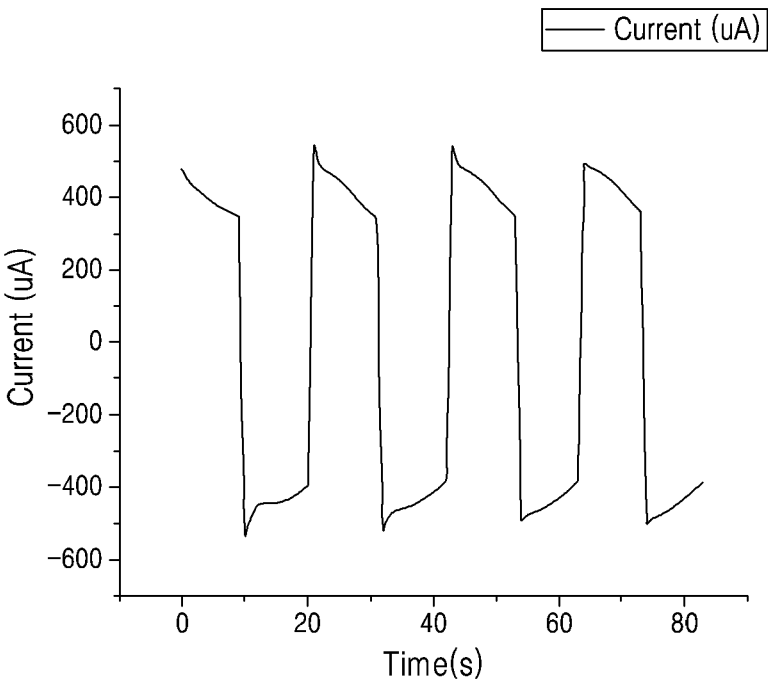
FIG. 15A is a current response graph of an electro-osmotic pump using a Ti plate with $RuO_x$ drop-coated and thermo-compressed thereon as an electrode when 2.5 V is applied to both ends of the electrode for 10 seconds
Figure 15B:
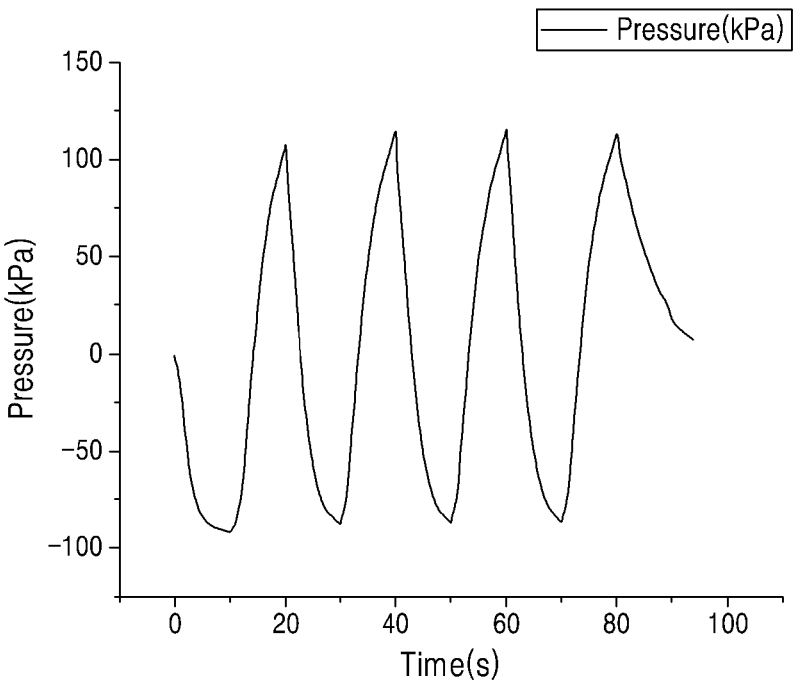
FIG. 15B is a pressure response graph under the same conditions according to an example of the present disclosure.

FIG. 15A is a current response graph of an electro-osmotic pump using a Ti plate with RuO$_x$ drop-coated and thermo-compressed thereon as an electrode when 2.5 V is applied to both ends of the electrode for 10 seconds and FIG. 15B is a pressure response graph under the same conditions according to an embodiment of the present disclosure.

Referring to FIG. 15A and FIG. 15B, the electro-osmotic pump was continuously operated in 0.5 mM Li$_2$SO$_4$ pumping solution with a pulse time of 10 seconds at each of +2.5 V and −2.5 V. When the electro-osmotic pump for test was constructed, a porous silica membrane of 2 mm in thickness, 6 mm in width and 10 mm in length as shown in FIG. 2 was used. Also, a Ti plate of 6 mm in width and 15 mm in length was used as an electrode and substrate.

TABLE 11

| | | Flow amount (µL/ 10 sec) | Pres- sure (kPa) | Flow per power (µL/mW) |
|---|---|---|---|---|
| Performance of electro-osmotic pump using electrode with RuO$_x$ drop-coated and thermo-compressed | | | | |
| Electrode | Current (µA) | | | |
| RuO$_x$ thermo- compressed | 565~362, −567~−378 | 5.0 | 203 | 4.3 |

Referring to Table 11, it was confirmed that the impermeable substrate material electrode exhibits its own performance even when strong external stimuli are applied thereto. Also, it was confirmed that the thermo-compression, which is one of electrode surface treatment methods, can be employed to manufacture an electrode. Therefore, it was confirmed that the electrode using the impermeable plate-shaped substrate material can be applied to the electro-osmotic pump after being processed externally by various methods.

A detailed description of components identical in function to those described above with reference to FIG. 2A to FIG. 15B will be omitted.

Figures 16A, 16B:
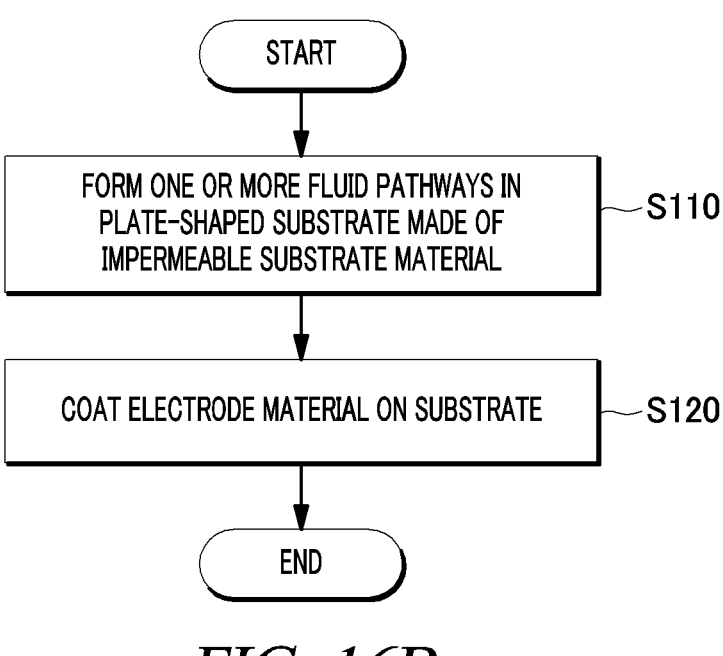
FIG. 16A and FIG. 16B are flowcharts for explaining a method of manufacturing an electrode that constitutes an electro-osmotic pump according to another embodiment of the present disclosure.

FIG. 16A and FIG. 16B are flowcharts for explaining a method of manufacturing an electrode that constitutes an electro-osmotic pump according to another embodiment of the present disclosure.

A method of manufacturing an electrode that constitutes an electro-osmotic pump according to an embodiment of the present disclosure include forming at least one fluid pathways in a plate-shaped substrate made of an impermeable substrate material (S110) and coating an electrode material on the substrate to obtain an electrode (S120).

A method of manufacturing an electrode that constitutes an electro-osmotic pump according to another embodiment of the present disclosure includes a process of coating an electrode material on a plate-shaped substrate made of an impermeable substrate material (S210) and a process of forming at least one fluid pathways in the substrate to obtain an electrode (S220).

The electro-osmotic pump includes the membrane 11 that allows fluid movement and the first electrode 130 and the second electrode 150 respectively provided on both sides of the membrane 11. Herein, the first electrode 130 and the second electrode 150 are electrodes manufactured by the method including the processes S110 and S120 or the processes S210 and S220, and the fluid may move through the fluid pathway by an electrochemical reaction of the first electrode 130 and the second electrode 150.

In the coating processes (S110 and S210), the electrode material may be coated by at least one method of drop-coating, dip-coating, spin-coating, spray-coating, printing, pyrolysis and electroplating.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

11: Membrane
13, 15: Porous electrode
17, 46: Power supply
19: Fluid pathway part
20: Strip
30: Frame
130: First electrode
150: Second electrode
210: First separator
220: Second separator
230: Electro-osmotic pump
240: Transfer chamber
240a: Suction opening
240b: Discharge opening
250: Monitoring chamber
260: Pressure measuring unit
270: Suction valve

280: Discharge valve
40: fluid pumping system
41: Reservoir
42: Suction path
45: Discharge path
47: Control circuit

We claim:

1. An electro-osmotic pump, comprising:
a membrane that allows movement of a fluid; and
a first electrode and a second electrode respectively provided on both sides of the membrane,
wherein each of the first electrode and the second electrode comprises a plate-shaped substrate made of an impermeable substrate material, an electrode material coated thereon, and at least one fluid pathway formed through the plate-shaped substrate,
wherein the impermeable substrate material includes at least one of a conducting material, a semiconducing material, or a non-conducting material, and
wherein the fluid is moved through the at least one fluid pathway by an electrochemical reaction of the first electrode and the second electrode.

2. The electro-osmotic pump of claim 1,
wherein the conducting material includes at least one material selected from the group consisting of carbon, nickel, copper, gold, silver, titanium, ruthenium, palladium, zinc, platinum, cobalt, lead, manganese, tin, iridium, iron, aluminum, gold oxide, silver oxide, ruthenium oxide, platinum oxide, lead oxide, iridium oxide, polypyrroles, polypyrrole derivatives, polyanilines, polyaniline derivatives, polythiophenes, polythiophene derivatives, and combinations thereof.

3. The electro-osmotic pump of claim 1,
wherein the semiconducing material includes at least one material selected from the group consisting of Sn, Si, SiC, Ge, Se, AlP, AlAs, AlSb, GaP, GaAs, InP, InAs, InSb, ZnS, ZnSe, ZnTe, CdS, CdSe, CdTe, ZnO, $SnO_2$, $SiO_2$, $CeO_2$, $TiO_2$, $WO_3$, $Fe_2O_3$, $In_2O_3$, CuO, polypyrroles, polypyrrole derivatives, polyaniline, polyaniline derivatives, polythiophenes, polythiophene derivatives, Prussian blue, iron hexacyanoferrate (FeHCF), copper hexacyanoferrate (CuHCF), cobalt hexacyanoferrate (CoHCF), nickel hexacyanoferrate, and combinations thereof.

4. The electro-osmotic pump of claim 1,
wherein the non-conducting material includes at least one material selected from the group consisting of polyethylene, polypropylene, polyvinylidene fluoride, polyvinylidene chloride, ethylenevinylalcohol, polyethylene terephthalate, poly(methyl methacrylate), polycarbonate, polyethylene sulfone, polyolefine, polyamide, polyester, aramid, acryl, polyethylene oxide, polycaprolactone, polycarbonate, polyurethane, polystyrene, polybezimidazole, poly(2-hydroxyethyl methacrylate), poly(ether imide), styrene-butadiene-styrene block copolymer, poly(ferrocenyldimethylsilane), polyimide, and combinations thereof.

5. The electro-osmotic pump of claim 1,
wherein the electrode material includes at least one material selected from the group consisting of metals, metal oxides, conducting polymers, metal hexacyanoferrates, carbon nanostructures, and composites thereof.

6. The electro-osmotic pump of claim 5,
wherein the metals include at least one metal selected from the group consisting of silver, zinc, lead, manganese, copper, tin, ruthenium, nickel, gold, titanium, palladium, platinum, cobalt, iron, aluminum, iridium, and combinations thereof.

7. The electro-osmotic pump of claim 5,
wherein the metal oxides include at least one metal oxide selected from the group consisting of vanadium oxide, molybdenum oxide ($MoO_3$), tungsten oxide ($WO_3$), ruthenium oxide, iridium oxide, manganese oxide, cerium oxide ($CeO_2$), silver oxide, platinum oxide, lead oxide, polyoxometalate, and combinations thereof.

8. The electro-osmotic pump of claim 5,
wherein the conducting polymers include at least one polymer selected from the group consisting of polyaniline, polyaniline derivatives, polythiophene, polythiophene derivatives, polypyrrole, polypyrrole derivatives, quinone polymers, quinone polymer derivatives, polythionine, and combinations thereof.

9. The electro-osmotic pump of claim 5,
wherein the metal hexacyanoferrates include at least one metal hexacyanoferrate selected from the group consisting of Prussian blue, iron hexacyanoferrate (FeHCF), copper hexacyanoferrate (CuHCF), cobalt hexacyanoferrate (CoHCF), nickel hexacyanoferrate (NiHCF), and combinations thereof.

10. The electro-osmotic pump of claim 5,
wherein the carbon nanostructures include at least one carbon nanostructure selected from the group consisting of carbon nanotube (CNT), graphene, carbon nanoparticle, fullerene, graphite, and combinations thereof.

11. The electro-osmotic pump of claim 1,
wherein each of the surface of the electrode material in the first electrode or the second electrode is independently smoothly processed by thermos-compression or decal transfer.

12. The electro-osmotic pump of claim 1,
wherein, in the first electrode and/or the second electrode, the ratio of the area of the at least one fluid pathway to the total area of the electrodes is greater than 0% to 50% or less.

13. The electro-osmotic pump of claim 1, further comprising:
frames that support the first electrode and the second electrode on both sides thereof respectively, and have a fluid pathway.

14. The electro-osmotic pump of claim 1, further comprising:
a power supply that supplies a voltage to the first electrode and the second electrode.

15. The electro-osmotic pump of claim 1,
wherein a voltage with alternating polarities is supplied to each of the first electrode and the second electrode and repeated electrochemical reactions occur in forward and reverse directions, and thus, a pumping force is generated by a repeated reciprocating movement of the fluid.

16. The electro-osmotic pump of claim 15,
wherein each of the first electrode and the second electrode is repeatedly consumed and regenerated by the repeated electrochemical reactions in forward and reverse directions.

17. A method of manufacturing a first electrode or a second electrode that constitutes an electro-osmotic pump, the method comprising:
forming at least one fluid pathway through a plate-shaped substrate made of an impermeable substrate material and coating an electrode material on the plate-shaped substrate to obtain the first electrode or the second electrode; or coating an electrode material on a plate-shaped substrate made of an impermeable substrate material and forming at least one fluid pathway through the plate-shaped substrate to obtain the first electrode or the second electrode, wherein the impermeable substrate material includes at least one of a conducting material, a semiconducting material, or a non-conducting material, and wherein a fluid is moved through the at least one fluid pathway of the electro-osmotic pump by an electrochemical reaction of the first electrode and the second electrode.

18. The method of manufacturing an electrode of claim 17, wherein the electro-osmotic pump includes:

a membrane that allows movement of the fluid; and the first electrode and the second electrode respectively provided on both sides of the membrane, and wherein the first electrode and the second electrode are manufactured by the method of claim 17.

19. The method of manufacturing an electrode of claim 17, wherein in the coating process, the electrode material is coated by at least one method of drop-coating, dip-coating, spin-coating, spray-coating, printing, pyrolysis or electroplating.

20. An electro-osmotic pump, comprising:

a membrane that allows movement of a fluid; and a first electrode and a second electrode respectively provided on both sides of the membrane, wherein each of the first electrode and the second electrode comprises a plate-shaped substrate made of an impermeable substrate material and at least one fluid pathway formed through the substrate, wherein the impermeable substrate material includes at least one of silver, zinc, lead, manganese, copper, tin, ruthenium, nickel, gold, titanium, palladium, platinum, cobalt, iron, aluminum, iridium, or combinations thereof, and wherein the fluid is moved through the at least one fluid pathway by an electrochemical reaction of the first electrode and the second electrode.

* * * * *